US012320172B2

(12) United States Patent
Wang

(10) Patent No.: US 12,320,172 B2
(45) Date of Patent: Jun. 3, 2025

(54) DOOR LOCK AND CONTROL CIRCUIT FOR THE DOOR LOCK

(71) Applicant: Illinois Tool Works Inc., Glenview, IL (US)

(72) Inventor: Yang Wang, Dongguan (CN)

(73) Assignee: Illinois Tool Works Inc., Glenview, IL (US)

( * ) Notice: Subject to any disclaimer, the term of this patent is extended or adjusted under 35 U.S.C. 154(b) by 746 days.

(21) Appl. No.: 17/275,588

(22) PCT Filed: Sep. 24, 2019

(86) PCT No.: PCT/US2019/052615
§ 371 (c)(1),
(2) Date: Mar. 11, 2021

(87) PCT Pub. No.: WO2020/068761
PCT Pub. Date: Apr. 2, 2020

(65) Prior Publication Data

US 2021/0363801 A1 Nov. 25, 2021

(30) Foreign Application Priority Data

Sep. 25, 2018 (CN) ......................... 201811115161.X
Sep. 25, 2018 (CN) ......................... 201821567901.9

(51) Int. Cl.
*E05C 19/02* (2006.01)
*D06F 39/14* (2006.01)
(Continued)

(52) U.S. Cl.
CPC .............. *E05C 19/02* (2013.01); *D06F 39/14* (2013.01); *E05B 47/0603* (2013.01); *D06F 2105/44* (2020.02)

(58) Field of Classification Search
CPC ......... Y10T 292/0951; Y10T 292/0948; Y10T 292/0956; Y10T 292/1089; Y10S 292/69; E05C 19/02; D06F 39/14; E05B 47/0603
See application file for complete search history.

(56) References Cited

U.S. PATENT DOCUMENTS 5,520,424 A * 5/1996 Hapke ..................... D06F 37/42 292/341.17
10,119,312 B2 * 11/2018 Wang ...................... E05C 19/12
(Continued)

FOREIGN PATENT DOCUMENTS

WO WO-2013181289 A1 * 12/2013 ............. D06F 37/42
WO 2015187223 A1 12/2015
WO WO-2019010061 A1 * 1/2019 ............. D06F 37/42

OTHER PUBLICATIONS

International Search Report for International Application No. PCT/US2019/052615 filed Sep. 24, 2019, dated Jan. 27, 2020, 7 pages.
(Continued)

*Primary Examiner* — Gilbert Y Lee
*Assistant Examiner* — Yahya Sidky
(74) *Attorney, Agent, or Firm* — Boyle Frederickson S.C.

(57) ABSTRACT

The present application relates to a door lock and a control circuit thereof. The door lock includes a switch means, a switch driving means capable of opening the switch means, and a driving slider. The driving slider is capable of driving the switch driving means. The driving slider is capable of being driven by a door hook. The switch driving means (that is, a swing lever) and a lock pin are capable of jointly controlling opening of the switch means. The switch driving means (that is, the swing lever) is driven by a mechanical structure (that is, the driving slider), and the lock pin can be driven by an electronic signal and a circuit structure (for example, a second current loop), thereby improving the
(Continued)

sensitivity and reliability in disconnecting the power supply under abnormal working conditions.

21 Claims, 16 Drawing Sheets

(51) Int. Cl.
*D06F 105/44* (2020.01)
*E05B 47/06* (2006.01)

(56) References Cited

U.S. PATENT DOCUMENTS

| | | | | |
|---|---|---|---|---|
| 2017/0067270 | A1* | 3/2017 | Lang | E05B 47/0002 |
| 2017/0211221 | A1 | 7/2017 | Uros | |
| 2018/0008120 | A1* | 1/2018 | Dirnberger | D06F 37/42 |
| 2019/0292714 | A1* | 9/2019 | Bicic | D06F 39/14 |

OTHER PUBLICATIONS

Written Opinion for International Application No. PCT/US2019/052615 filed Sep. 24, 2019, dated Jan. 27, 2020, 10 pages.
International Preliminary Report on Patentability and Written Opinion for International Application No. PCT/US2019/052615 filed Sep. 24, 2019, dated Mar. 23, 2021, 9 pages.
Office Action for Application No. KR 10-2021-7012289 dated Oct. 22, 2023 and a machine translation from the USPTO's Global Dossier accessed Oct. 24, 2023.
Office Action for Application No. JP 2021-516668 dated Oct. 11, 2023 and a machine translation from the USPTO's Global Dossier accessed Oct. 24, 2023.

* cited by examiner

A-A

B-B

DOOR LOCK AND CONTROL CIRCUIT FOR THE DOOR LOCK

CROSS-REFERENCE TO RELATED APPLICATIONS

This international application claims priority to Chinese Patent Application No. 201811115161.X, filed on: Sep. 25, 2018 and to Chinese Patent Application No. 201821567901.9, filed on: Sep. 25, 2018 and each of which is incorporated herein by reference in its entirety.

TECHNICAL FIELD

The present application relates to a door lock of an electrical appliance and a control circuit thereof.

BACKGROUND ART

At present, a door of an electrical appliance (such as a washing machine) is locked to a panel of the electrical appliance by a door lock. Such a door lock needs to meet safety requirements under certain conditions. For example, when the door lock hook is normally pulled out of the door lock, the power supply of the electrical appliance can be cut off rapidly and safely. In addition, in some extreme cases, for example, in a case where the door is forcibly pulled by an external force during operation of the electrical appliance, after a related component of the door lock (for example, the door lock hook, a cam, a slider or a lock pin) is broken by the pull force and the door of the electrical appliance is forcibly opened, the door lock also needs to cut off the power supply of the electrical appliance rapidly and safely, to immediately stop the operation of the electrical appliance.

SUMMARY OF THE INVENTION

In view of the above defects of the prior art, the present application provides a safe, reliable, and high-sensitivity door lock and a control device thereof, so that when the door of an electrical appliance is forcibly opened, the control device can cut off the working circuit of the electrical appliance in time to stop the operation of the electrical appliance. Moreover, even if a cam or other components of the door lock are damaged when the door of the electrical appliance is forcibly opened, it can be ensured that the operation of the electrical appliance can be stopped in time.

An aspect of the present application provides a door lock, including: a switch means; a switch driving means, wherein the switch driving means is capable of opening the switch means; and a driving slider, wherein the driving slider is capable of driving the switch driving means, and the driving slider is capable of being driven by a door book.

According to the first aspect, the switch driving means is a swing lever, and the swing lever is capable of rotating to open the switch means.

According to the first aspect, the door lock further includes: a cam, wherein the cam is capable of receiving the door hook, and the cam has a locked position; a locking slider means, wherein the locking slider means is configured to maintain the cam at the locked position; and a lock pin, wherein the lock pin is configured to lock the locking slider means.

According to the first aspect, the lock pin has a lock pin locked position and a lock pin unlocked position, wherein when the lock pin is at the lock pin locked position, the lock pin locks the locking slider means; and when the lock pin is at the lock pin unlocked position, the lock pin releases the locking slider means and opens the switch means.

According to the first aspect, under normal working conditions, the lock pin is capable of opening the switch means; and in the case of forced door pulling, the switch driving means is capable of opening the switch means.

According to the first aspect, the locking slider means includes: a first locking slider and a second locking slider, wherein the first locking slider is capable of being driven by the cam to move along a first direction, and the first locking slider is capable of driving the second locking slider to move along a second direction; the lock pin is configured to lock the second locking slider; and the first direction is perpendicular to the second direction.

According to the first aspect, the door lock includes a switch box and a base, the switch means being located inside the switch box, and the driving slider and the second locking slider are arranged side by side between the switch box and the base and move along the second direction.

According to the first aspect, the switch means includes: an elastic piece; and a stationary contact; wherein one end of the swing lever is capable of driving the elastic piece; the swing lever has a swing lever working position and a swing lever idle position, wherein when the swing lever is at the swing lever working position, the swing lever detaches the elastic piece from the stationary contact, so as to open the switch means; and when the swing lever is at the swing lever idle position, the swing lever does not affect closing or opening of the switch means.

According to the first aspect, the driving slider moves between a driving slider locked position and a driving slider unlocked position along a second direction along with movement of the door hook; when the driving slider is at the driving slider locked position, the driving slider drives the swing lever to move to the swing lever working position; and when the driving slider is at the driving slider unlocked position, the driving slider drives the swing lever to move to the swing lever idle position.

According to the first aspect, the swing lever includes a shaft, and the swing lever is capable of rotating about the shaft; the swing lever further includes an upper arm and a lower arm, one end of the upper arm being connected to the shaft, and the other end of the upper arm being configured to connect to the elastic piece; and one end of the lower arm being connected to the shaft, and the other end of the lower arm being capable of being driven by the driving slider.

According to the first aspect, the shaft of the swing lever is disposed parallel to the driving slider along a second direction.

According to the first aspect, the driving slider is connected to a restoring means, and the restoring means applies a pre-tightening force to the driving slider, to enable the driving slider to move to the driving slider locked position.

According to the first aspect, the driving slider has a door lock driving chamfer, and the door hook drives the driving slider through the door lock driving chamfer, wherein when the door hook is inserted into a door lock hole along a third direction, the door hook drives, through the door lock driving chamfer, the driving slider to move along a second direction.

According to the first aspect, the driving slider has a swing lever driving chamfer, and the driving slider drives the lower arm of the swing lever through the swing lever driving chamfer, and when the driving slider is at the driving slider locked position, the driving slider drives, through the swing lever driving chamfer, the lower arm of the swing lever to move to the swing lever working position.

According to the first aspect, the door lock includes a switch box, the switch means and the swing lever being disposed inside the switch box, and the driving slider being disposed outside the switch box; and a bottom portion of the switch box has a hole, and one end of the swing lever extends outward through the hole and is configured to be driven by the driving slider outside the switch box.

Another aspect of the present application provides a control circuit of a door lock, including: a switch means; a switch driving means, wherein the switch driving means is capable of opening the switch means; and a lock pin, wherein the lock pin is capable of opening the switch means.

According to the second aspect, the switch driving means is driven by a mechanical structure; and the lock pin is driven by an electronic signal.

According to the second aspect, the control circuit further includes: a driving slider, wherein the driving slider is capable of driving the switch driving means, and the driving slider is capable of being driven by a door hook.

According to the second aspect, the switch driving means is a swing lever, and the swing lever is capable of rotating to open the switch means.

According to the second aspect, the control circuit further includes: a lock pin, wherein the lock pin is configured to lock and release a locking slider means to maintain or not maintain a cam at a locked position; and an electronic driving means, wherein the electronic driving means is driven by an electronic signal to actuate the lock pin to lock and release the locking slider means.

According to the second aspect, the control circuit further includes: a connection terminal, a control terminal and a common terminal, wherein a first current loop is formed between the connection terminal and the common terminal through the switch means, and a second current loop is formed between the control terminal and the common terminal through the electronic driving means; the first current loop and the second current loop are connected to the common terminal through a common connection point; the connection terminal can be connected in series with a power supply in the first current loop through an electric motor; the control terminal can be connected in series with the power supply in the second current loop through the electronic driving means; the common terminal is connected to a ground of the power supply; and the switch means is capable of being closed or opened, and the closing or opening of the switch means can be used to control connection or disconnection of the first current loop.

For a thorough understanding of the objectives, features and effects of the present application, the ideas, specific structures and technical effects of the present application will be described below in further detail with reference to the accompanying drawings.

DETAILED DESCRIPTION

This application relates to Chinese Patent Application No. 201310016120.6 filed on Jan. 16, 2013 and entitled "Lock device and means mounted with the same", which is incorporated herein by reference in its entirety.

Various specific embodiments of the present application will now be described below with reference to the accompanying drawings forming a part of the specification. It should be appreciated that although terms representing directions, for example, directional or orientational terms such as "front," "rear," "upper," "lower," "left," "right," "top," and "bottom," are used in the present application to describe exemplary structural portions and elements of the present application. However, such terms are only used for the convenience of description and are determined based on exemplary orientations shown in the accompanying drawings. Because the embodiments disclosed in the present application can be configured in different orientations, such directional terms are used for purpose of illustration only and are not intended to be limiting. Whenever possible, the same or similar reference numbers and symbols are used throughout the accompanying drawings below to refer to the same or similar parts, to avoid repeated description.

For the convenience of description of specific embodiments, the present application is described by way of example by using a width direction of the door lock 100 as a direction x (a first direction), using a length direction of the door lock 100 as a direction y (a second direction), and using a height direction of the door lock as a direction z (a third direction).

Figure 1:
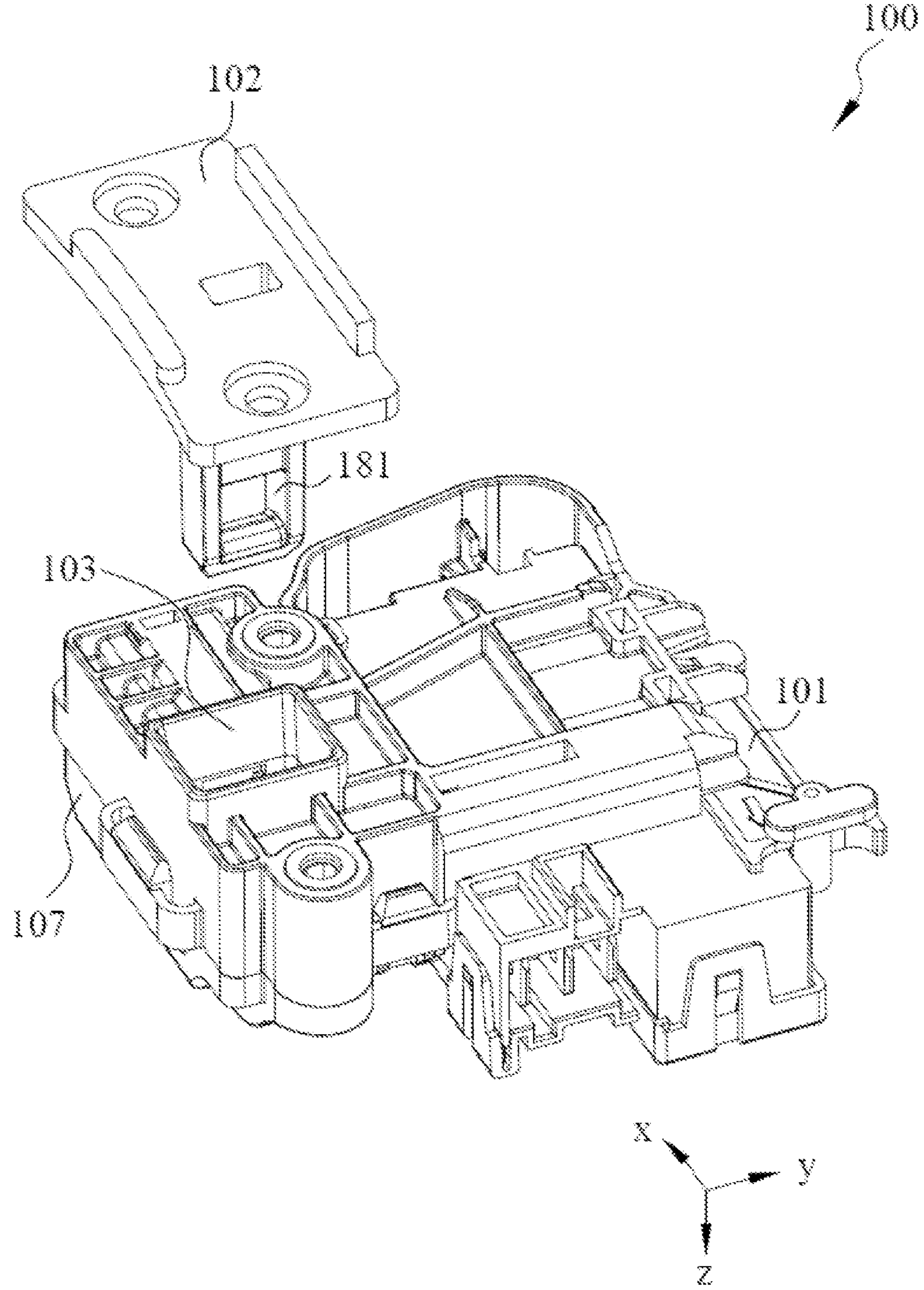
FIG. 1 is a schematic perspective structural front view of a door lock 100 of the present application.

FIG. 1 is a schematic perspective structural front view of a door lock 100 of the present application, where relative positions of a door lock hole 103 and a door hook 102 on the door lock 100 are illustrated. As shown in FIG. 1, the door lock 100 includes a base 101. A front side of a left side portion of the base 101 is provided with the door lock hole 103, and a rear side of the left side portion of the base 101 is connected with a cam cap 107. The door lock hole 103 is configured to accommodate the door hook 102. The door hook 102 is mounted on a door of an electrical appliance (not shown), and during opening and closing of the door, the door hook 102 moves vertically along with movement of the door of the electrical appliance, to enter and leave the door lock hole 103. The door hook 102 is located above the door lock hole 103. When the door hook 102 is inserted into the door lock 100 through the door lock hole 103 on the front side of the base 101, the door hook 102 is fastened to a cam 208 (referring to the cam 208 in FIG. 2) inside the door lock 100. When the cam 208 is locked, the door of the electrical appliance is locked accordingly.

Figure 2:
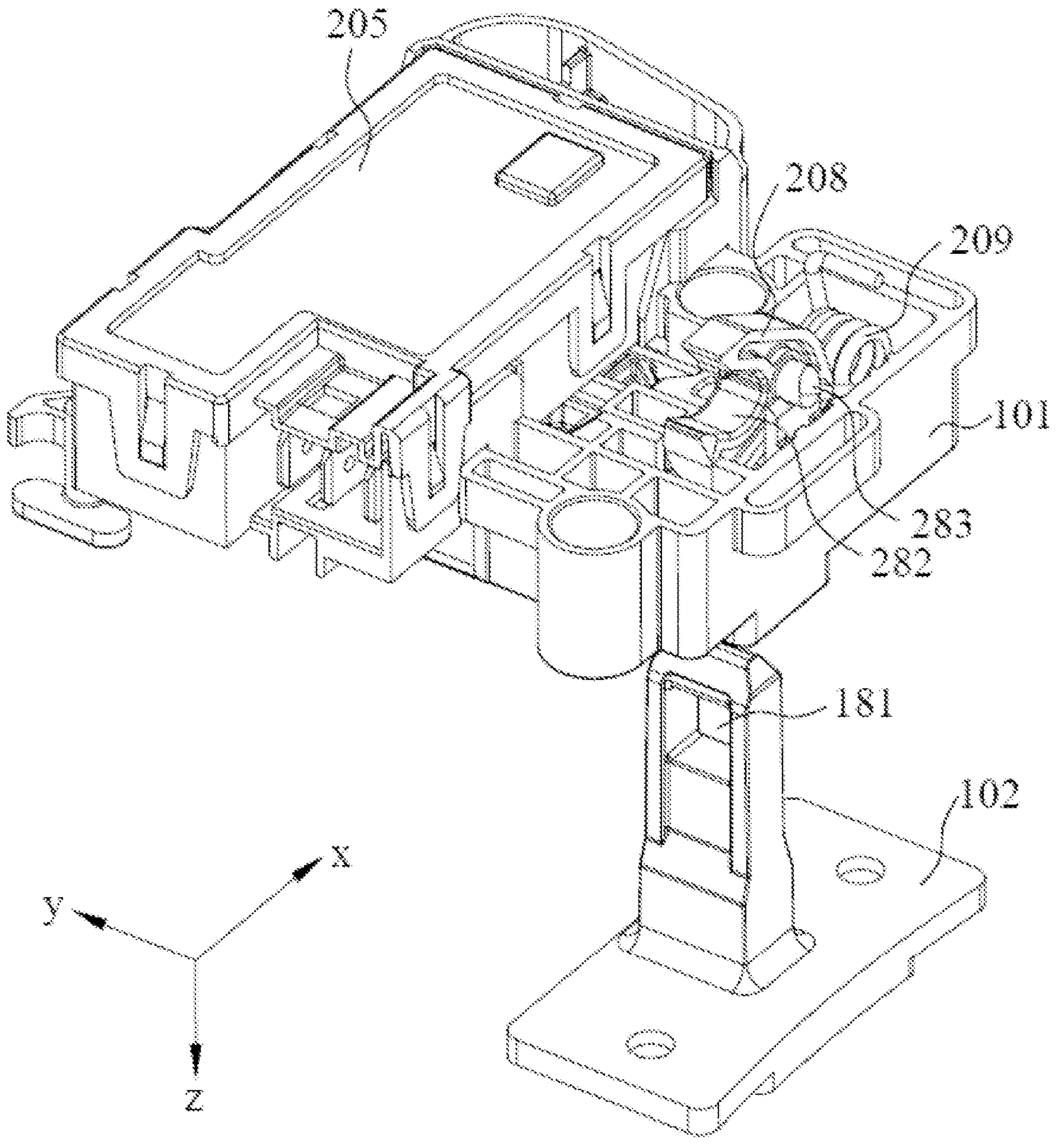
FIG. 2 is a schematic perspective structural rear view of the door lock 100 after a cam cap 107 of the door lock 100 in FIG. 1 is removed.

FIG. 2 is a schematic perspective structural rear view of the door lock 100 after a cam cap 107 of the door lock 100 in FIG. 1 is removed, to more specifically illustrate the position relationship between the base 101, a switch box 205 and the cam 208.

As shown in FIG. 2, the cam cap 107 (not shown in FIG. 2) and the switch box 105 are disposed side by side above the base 101 and adjacent to each other along the direction y (the second direction). The base 101 is provided thereon with the cam 208, and the cam 208 is disposed below the cam cap 107 and above the door lock hole 103 (referring to FIG. 1, the cam 208 is disposed below the door lock hole 103), so that the door hook 102 can be received by the cam 208 through the door lock hole 103. During closing of the door, the door hook 102 is inserted into the door lock hole 103 from the bottom up (referring to FIG. 1, the door hook 102 is inserted into the door lock hole 103 from the top down), so that the cam 208 can be pushed to rotate to its locked position; during opening of the door, the door hook 102 is pulled out of the door lock hole 103 from the top down, so that the cam 208 can be pulled to leave its locked position (or to its unlocked position).

Specifically, the cam 208 is provided with an opening slot 282. The opening slot 282 is configured to accommodate an end portion of the door book 102. An upper end and a lower end of the opening slot 282 are configured for contact with a front end of the door hook 102. When the door hook 102 is inserted into the door lock hole 103, an outer side of the front end of the door hook 102 presses against the upper end of the opening slot 282 to push the cam 208 to rotate clockwise, so that the lower end of the opening slot 282 is inserted into a hole 181 of the door hook 102 to hook the door hook 102, and the cam 208 reaches its locked position. When the door hook 102 is pulled out of the door lock hole 103, the outer side of the front end of the door hook 102 presses against the lower end of the opening slot 282 to pull the cam 208 to rotate anticlockwise, so that the lower end of the opening slot 282 leaves the hole 181 of the door hook 102, and the cam 208 leaves its locked position (or to its unlocked position).

The cam 208 is fixed to the base 101 through a spindle 283 on two sides, so that the cam 208 can rotate about the spindle 283. An elastic component 209 is mounted on the cam 208. The elastic component 209 applies a certain pre-tightening force to the cam 208 to drive or stop rotation of the cam 208. The elastic component 209 may be a torsional spring shown in FIG. 2 but may also be other elastic components. As the elastic component 209 acts on the cam 208, the cam 208, after reaching an inflection point, can rapidly rotate back under an external force (a force applied to close the door) to generate an auxiliary door pulling force, so that the lower end of the opening slot 282 of the cam 208 is hooked to the hole 181 of the door hook 102; correspondingly, when an attempt is made to open the door, the elastic component produces a resistance to prevent the door of the washing machine from being opened unintentionally. Likewise, when not locked (for example, locked by a locking slider means), such a mechanism is elastic, and the door of the electrical appliance is allowed to be pushed open from the inside of the electrical appliance if necessary.

In FIG. 2, the door lock 100 further includes the switch box 205. The switch box 205 is mounted on the left side of the base 101 (referring to FIG. 1, the switch box 205 is mounted on the right side of the base 101). The switch box 205 mainly functions to control movement of a lock pin to lock or unlock the locking slider means, so as to close or open a switch means (referring to FIG. 10A to FIG. 10C) while locking or unlocking the cam 208 (referring to FIG. 9A to FIG. 9C), and functions to control movement of a swing lever (referring to FIG. 7A to FIG. B) to close or open the switch means, so as to switch on or cut off a power supply or a main circuit supply of the electrical appliance (referring to FIG. 11A to FIG. 11D).

Figure 3:
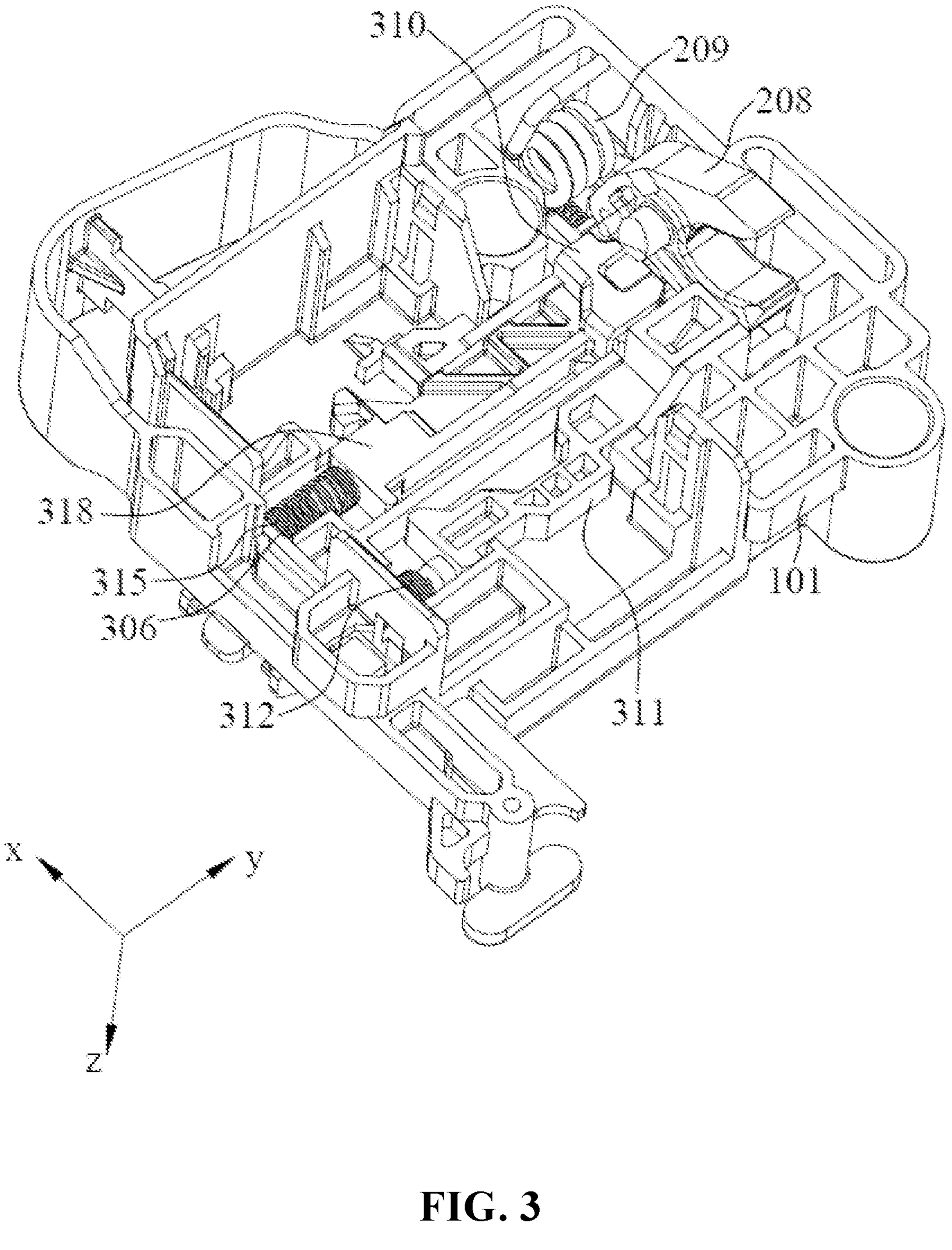
FIG. 3 is a schematic perspective structural view after a switch box 205 and a door hook 102 in FIG. 2 is removed.

FIG. 3 is a schematic perspective structural view after the switch box 205 and the door hook 102 in FIG. 2 is removed, to illustrate components inside the base 101 and illustrate the position relationship between the cam 208, a locking slider means 310 and a driving slider 311.

As shown in FIG. 3, the locking slider means 310 configured to maintain and lock the cam 208 at its locked position is mounted inside the base 101. For example, the locking slider means 310 includes a first locking slider 417 moveable along the direction x (referring to FIG. 4A to FIG. 4B) and a second locking slider 318 moveable along the direction y. By locking the second locking slider 318, the first locking slider 417 can be locked, so that the cam 208 can be maintained and locked at its locked position.

A driving means 311 is further disposed inside the base 101. The driving means 311 and the second locking slider 318 are disposed side by side between the switch box 205 and the base 101, and the driving means 311 is disposed on the right side of the second locking slider 318. For example, the driving means 311 is a slider. The slider may be an elongated slider in an embodiment but may also be driving means in other forms and shapes.

In FIG. 3, a spring 315 and a spring 312 are further disposed side by side inside the base 101. One end of the spring 315 presses against a tail end of the second locking slider 318, and the other end of the spring 315 presses against an inner wall 306 of the base 101. The spring 315 is configured to apply a certain pre-tightening force to the second locking slider 318. The spring 315 works together with the first locking slider 417, so that the second locking slider 318 can reciprocally move along the direction y (the second direction). Similarly, one end of the spring 312 presses against a tail end of the driving slider 311, and the other end presses against the inner wall 306 of the base 101. The spring 312 works together with the cam 208, so that the driving slider 311 also can reciprocally move along the direction y (the second direction). It should be appreciated by those skilled in the art that the springs 315 and 312 may also be other elastic components capable of providing a certain pre-tightening force.

Figure 4A:
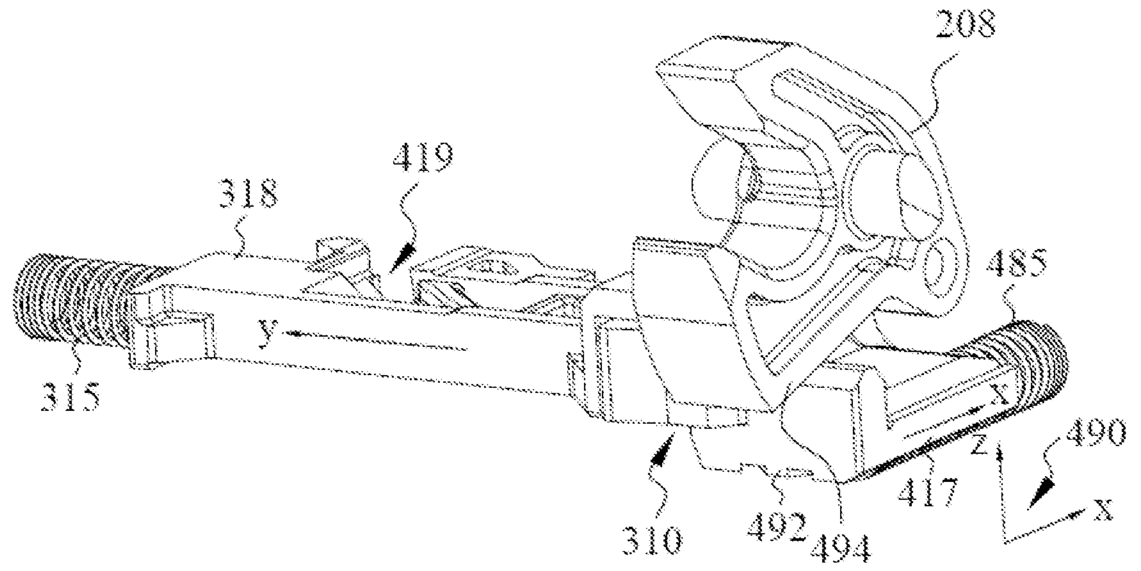
FIG. 4A to FIG. 4D are schematic perspective structural front and rear views after a base 101 and a driving slider 311 in FIG. 3 are removed and after a cam 208 in FIG. 3 is removed.
Figure 4B:
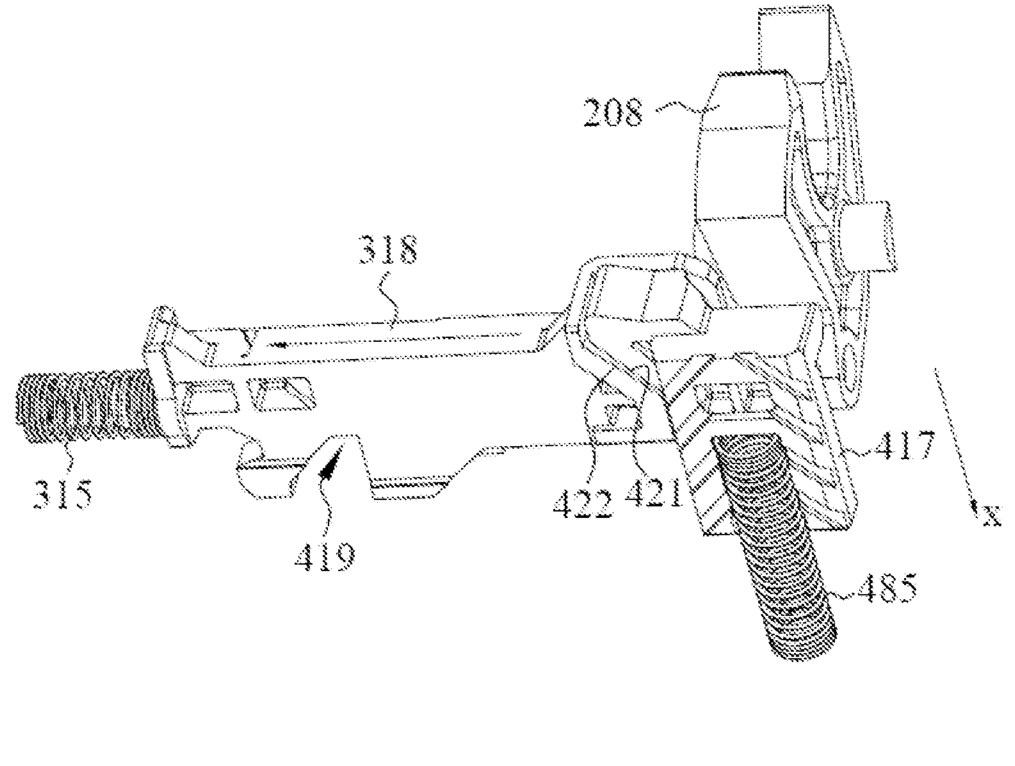
Figure 4C:
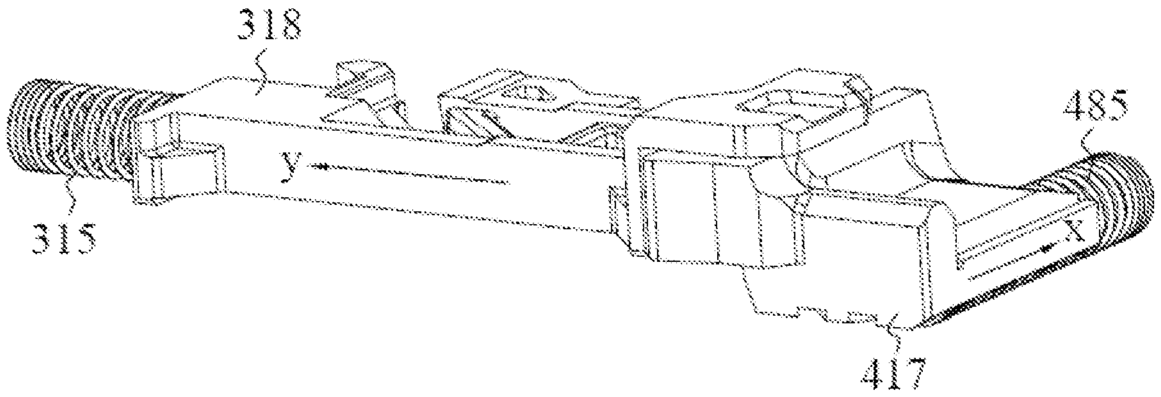
Figure 4D:
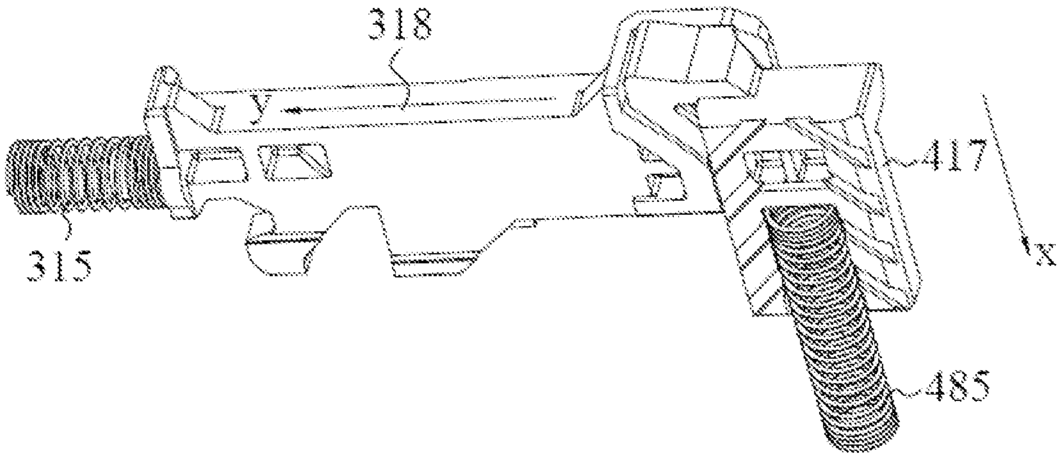

FIG. 4A to FIG. 4D are schematic perspective structural front and rear views after the base 101, the driving slider 311, the spring 312 and the elastic component 209 in FIG. 3 are removed and after the cam 208 is removed, to illustrate the cooperation relationship between the cam 208 and the locking slider means 310 (including the first locking slider 417 and the second locking slider 318) and illustrate the process of the cam 208 driving the locking slider means 310 to move. FIG. 4A is a front view illustrating the process of the cam 208 driving the first locking slider 417, and FIG. 4B is a rear view illustrating the process of the first locking slider 417 driving the second locking slider 318. FIG. 4C to FIG. 4D illustrate the structure after the cam 208 is removed from FIG. 4A to FIG. 4B, to more clearly illustrate the cooperation relationship between the first locking slider 417 and the second locking slider 318.

As shown in FIG. 4A to FIG. 4D, the first locking slider 417 and the second locking slider 318 are disposed in perpendicular directions, and the second locking slider 318 is perpendicular to a rotation plane 490 (that is, xz plane) of the cam 208 along a main body of the slider or a length direction (that is, the direction y) of the slider. In FIG. 4A to FIG. 4D, the first locking slider 417 is disposed below the cam 208, and the second locking slider 318 is on one side of the cam 208. A spring 485 is further disposed in the base 101. One end of the spring 485 presses against a tail end of the first locking slider 417, and the other end of the spring 485 presses against the inner wall 306 (not shown in FIG. 4A to FIG. 4D) of the base 101. The spring 485 is configured to apply a certain pre-tightening force to the first locking slider 417. A head portion 492 of the first locking slider 417 presses against a bottom portion 494 of the cam 208, and a chamfer 421 of a side portion of the first locking slider 417 presses against a complementary chamfer 422 of a head end of the second locking slider 318. In this way, in a case where the second locking slider 318 is not locked by the lock pin 525 (referring to FIG. 5A to FIG. 5C), when the cam 208 rotates anticlockwise (when the door hook 102 leaves the door lock hole 103), the bottom portion 494 of the cam 208 applies a force to the head portion 492 of the first locking slider 417, so that the first locking slider 417 moves from its locked position back to its unlocked position along the direction x, and the movement of the first locking slider 417 compresses the spring 485; and when the cam 208 rotates clockwise (when the door hook 102 is inserted into the door lock hole 103), the bottom portion 494 of the cam 208 leaves the head portion 492 of the first locking slider 417, and an elastic force generated by the spring 485 overcomes an elastic force of the torsional spring 209 on the cam 208 and drives the first locking slider 417 to move from the unlocked position toward the locked position along the direction x.

Similarly, in a case where the second locking slider 318 is not locked by the lock pin 525 (referring to FIG. 5A to FIG. 5C), when the first locking slider 417 moves from its locked position toward its unlocked position along the direction x, the chamfer 421 on the first locking slider 417 applies a force to the complementary chamfer 422 on the second locking slider 318, a component force generated on the two complementary chamfers causes the second locking slider 318 to move from its locked position toward its unlocked position along the direction y, and the movement of the second locking slider 318 compresses the spring 315; and when the first locking slider 417 moves from its unlocked position toward its locked position along the direction x, the chamfer 421 on the first locking slider 417 releases the force applied on the complementary chamfer 422 on the second locking slider 318, and the spring 315 pushes the second locking slider 318 to move from its unlocked position toward its locked position along the direction y.

Figure 5A:
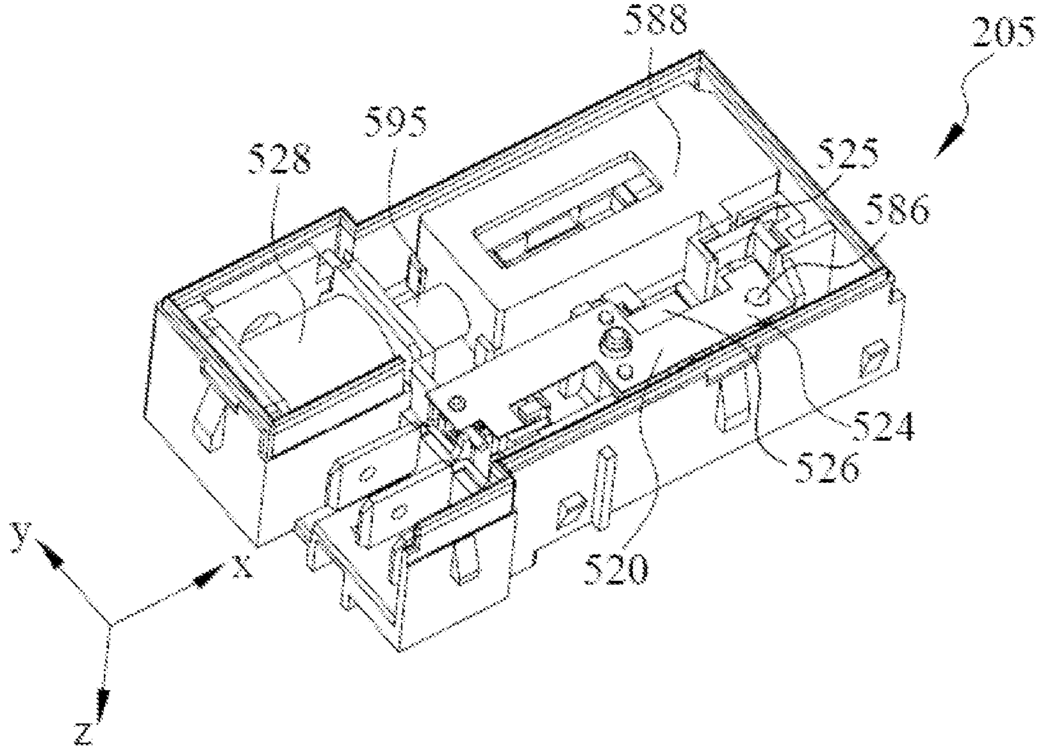
FIG. 5A to FIG. 5C are schematic perspective structural views illustrating components inside the switch box 205 and the structure of the switch box 205 after a box cover of the switch box 205 is removed.
Figure 5B:
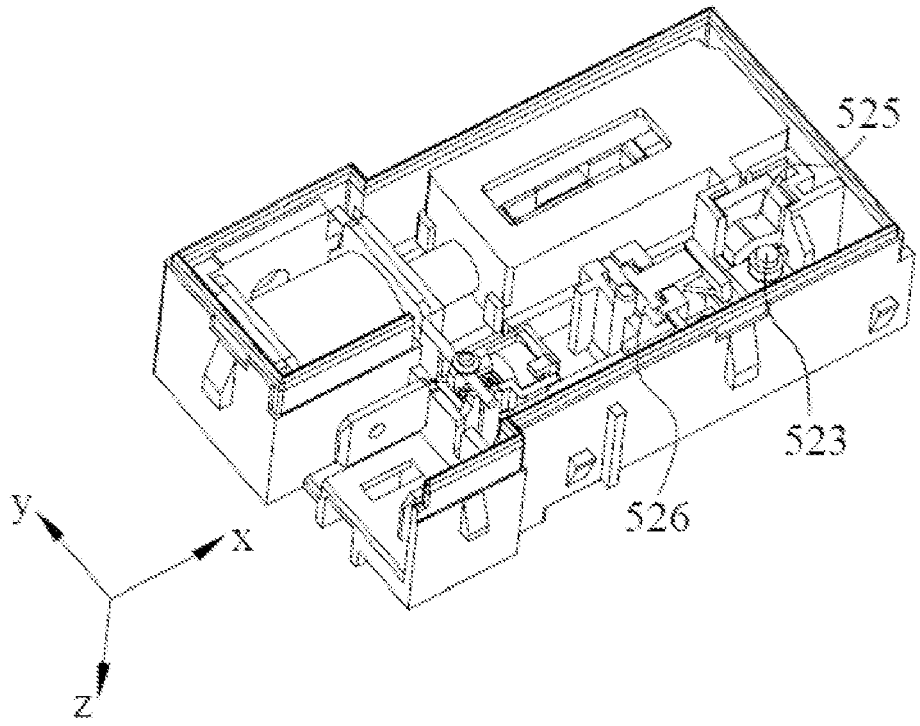
Figure 5C:
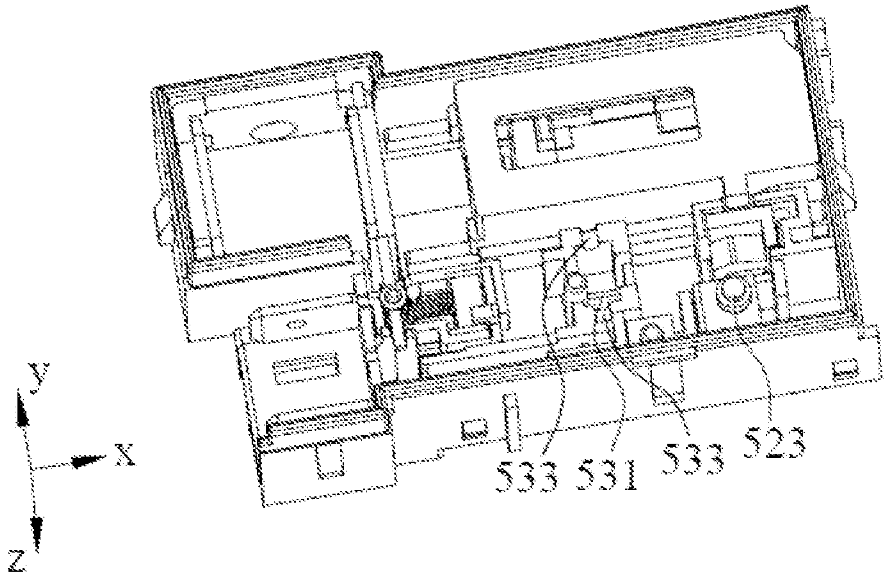

The second locking slider 318 is provided thereon with a locking hole 419, configured to receive the lock pin 525 (referring to FIG. 5A to FIG. 5C). When the second locking slider 318 and the first locking slider 417 are at their respective locked positions, the first locking slider 417 maintains the cam 208 at the locked position. In this case, if the lock pin 525 (referring to FIG. 5A to FIG. 5C) is inserted into the locking hole 419, the second locking slider 318 is locked, and the first locking slider 417 and the cam 208 are correspondingly locked, so that the door hook 102 can be locked in the cam 208.

However, in this case, if the lock pin 525 leaves the locking hole 419, the first locking slider 417 will maintain the cam 208 at the locked position even if the second locking slider 318 and the first locking slider 417 is at the locked position, because the second locking slider 318 is not locked by the lock pin 525 and the door hook 102 can be pulled out of the cam 208. By pulling out the door hook 102, the first locking slider 417 and the second locking slider 318 can be moved from its locked position to its unlocked position.

Therefore, through the transmission function of the first locking slider 417 and the second locking slider 318, the rotational movement of the cam 208 can be transformed into rectilinear movement of the second locking slider 318 along the direction y. In this way, not only the locking of the cam 208 can be controlled more easily (for example, the cam 208 is controlled by locking or releasing the locking of the second locking slider 318 by the lock pin 525 in FIG. 5A to FIG. 5C), but also a compact rectangular structure is achieved, further reducing the length of the door lock 100. In addition, the requirements on the precision and strength of the locking slider means 310 are lowered.

FIG. 5A to FIG. 5C are schematic perspective structural views illustrating components inside the switch box 205 and the structure of the switch box 205 after a box cover of the switch box 205 is removed. FIG. 5A is a schematic view illustrating relative positions of an elastic piece 524, a swing lever 526, and the lock pin 525; FIG. 5B is a schematic view illustrating positions of the swing lever 526 and the lock pin 525 in the switch box 205 after the elastic piece 524 is removed; FIG. 5C illustrates a detailed structure of the switch box 205 after the elastic piece 524 and the swing lever 526 are further removed.

As shown in FIG. 5A to FIG. 5C, the switch box 205 includes a switch means 520, the switch driving means 526 and the lock pin 525.

The switch means 520 includes an elastic piece 524. The elastic piece 524 extends along the direction x. A middle portion of the elastic piece 524 is connected to the inside of the switch box 205. A tail end of the elastic piece 524 has a movable contact 586. The switch means 520 further includes a stationary contact 523 located below the movable contact 586. By controlling the movable contact 586 and the stationary contact 523 to come into contact with or detach from each other, closing and opening of the switch means 520 can be controlled, thereby controlling connection and disconnection of the working circuit. Specifically, the position of the stationary contact 523 is fixed, and the movable contact 586 is capable of moving relative to the stationary contact 523. When a portion between the middle portion and the tail end (that is, the tail end provided with the movable contact 586) of the elastic piece 524 receives an upward force, the movable contact 586 of the tail end can move upward to detach from the stationary contact 523, so open the switch means 520. When the elastic piece 524 does not receive any external force, the elastic piece 524 restores to its initial position under the action of an elastic force. At the initial position, the movable contact 586 is in contact with the stationary contact 523, to close the switch means 520.

The switch driving means 526 and the lock pin 525 are located below the elastic piece 524 and may both be configured to apply an upward force to the elastic piece 524, so as to open the switch means 520. To save space of the switch box 205, the specific positions of the switch driving means 526 and the lock pin 525 may be reasonably arranged, for example, the switch driving means 526 and the lock pin 525 may be disposed side by side in the direction x. As an example, the lock pin 525 is closer to the movable contact

586 of the end portion of the elastic piece 524 than the switch driving means 526 is, so that the lock pin 525 can have a large range of movement in the direction z.

In the example shown in the figures, the switch driving means 526 is a swing lever, and is capable of being driven by a mechanical structure to rotate to jack up the elastic piece 524. Of course, the switch driving means 526 may also be driving portions in other forms, for example, the elastic piece 524 is jacked up by means of rectilinear movement.

FIG. 5B shows more clearly the swing lever 526 and the lock pin 525 that are located below the elastic piece 524, and the stationary contact 523 located below the movable contact 586. As an example, the swing lever 526 and the lock pin 525 are arranged below the elastic piece 524 along a front-rear direction (the direction x), and the stationary contact 523 and the lock pin 525 are disposed side by side in the width direction (the direction y) of the elastic piece 524. Although the swing lever 526 undergoes rotational movement and the lock pin 525 undergoes vertical movement, both the two movements can open the switch means 520.

Specifically, in FIG. 5B, the swing lever 526 has a swing lever working position and a swing lever idle position, and the lock pin 525 has a lock pin locked position (that is, the lock pin 525 is inserted into the locking hole 419 of the second locking slider 318) and a lock pin unlocked position (that is, the lock pin 525 leaves the locking hole 419 of the second locking slider 318). When the swing lever 526 is at the idle position and the lock pin 525 is at the locked position, the movable contact 586 of the elastic piece 524 is free from the swing lever 526 and the lock pin 525, and therefore can come into contact with the stationary contact 523, to close the switch means 520. When the swing lever 526 is at the working position or the lock pin 525 is at its unlocked position, the swing lever 526 or the lock pin 525 pushes the elastic piece 524, to detach the movable contact 586 of the elastic piece 524 from the stationary contact 523, to open the switch means 520.

In FIG. 5C, the swing lever 526 is further removed, so that the mounting space and structure of the swing lever 526 inside the switch box 205 can be shown more clearly. As shown in FIG. 5C, the switch box 205 has a chamber 531 configured for mount the swing lever 526 therein. Two clamping grooves 533 are respectively provided at top portions of two opposite side walls of the chamber 531. The clamping groove 533 can accommodate a shaft 732 of the swing lever 526 (referring to FIG. 7A to FIG. 7B). In the example shown in the figures, the configuration of the clamping groove 533 causes the shaft 732 of the swing lever 526 to be disposed along the direction y. Of course, in other examples, the shaft 732 may be disposed along the direction x, as long as the swing lever 526 can rotate about the shaft 732 to jack up the elastic piece 524 so that the movable contact 586 of the elastic piece 524 can be detached from the stationary contact 523.

Figure 6:
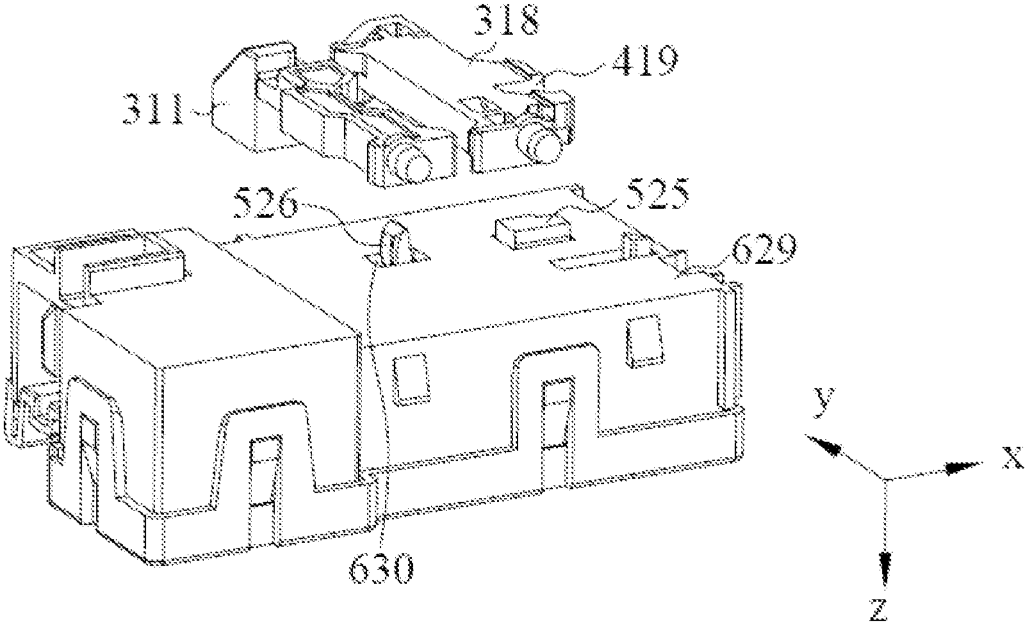
FIG. 6 is a schematic perspective structural view illustrating a rear side of the switch box 205, the driving slider 311 and the second locking slider 318.

Further, a bottom portion 629 of the switch box 205 has a hole 630 communicating with the chamber 531 (referring to FIG. 6), and the swing lever 526 in the chamber 531 can extend toward the outside of the switch box 205 through the hole 630 and is configured to be driven by the driving slider 311 (referring to FIG. 6).

Of course, when the switch driving means is other components or drives the elastic piece 524 through other forms of movements, those skilled in the art may design chambers of different structures in the switch box 205 to accommodate different types of switch driving means, which shall all fall within the protection scope of the present application.

In addition, as shown in FIG. 5A to FIG. 5C, the switch box 205 further includes a driver housing 528, an iron core housing 595, a self-locking block 588 and a pushing mechanism 587. The driver housing 528 is configured to accommodate an electronic driving means (not shown in FIG. 5A to FIG. 5C; an electronic driving means 1150 shown in FIG. 11A to FIG. 11B), and the electronic driving means 1150 is capable of driving the lock pin 525 through the self-locking block 588 to move upward or downward to lock or unlock the locking slider means 310 and close or open the switch means 520. As an example, the electronic driving means 1150 is an electromagnet, the driver housing 528 accommodates a coil 1172, the iron core housing 595 accommodates an iron core 1173, and the iron core 1173 is inserted into the coil 1172 (not shown in FIG. 5A to FIG. 5C; referring to FIG. 11A to FIG. 11B). The iron core 1173 is connected to the self-locking block 588, so that the iron core 1173 can drive the self-locking block 588 to move, so as to drive the lock pin 525 to move. In the example shown in the figures, the lock pin 525 moves vertically, also extends outward through the bottom portion of the switch box 205 so as to engage with the second locking slider 318 on the base 101 and is inserted into or leaves the locking hole 419 on the second locking slider 318.

Specifically, the self-locking block 588 has a locked state and an unlocked state and may be pushed by the iron core 1173 of the electronic driving means 1150 to switch between the two states. Each time the iron core 1173 moves, the self-locking block 588 moves accordingly, and switches between the locked state and the unlocked state once. A driving signal (or control signal) sent by a circuit board (not shown) of the electrical appliance may be an excitation signal, with each excitation pulse being capable of causing the iron core 1173 to move once, so as to push the self-locking block 588 to move once. Relative positions of the self-locking block 588 and the lock pin 525 are reasonably arranged, so that when the self-locking block 588 is at the locked state or the unlocked state, the lock pin 525 is correspondingly at its unlocked position or locked position.

A mechanical reversing means is disposed in the self-locking block 588. As an embodiment, the mechanical reversing means may be the pushing mechanism 587. When the self-locking block 588 in the unlocked state is pushed forward, the pushing mechanism 587 can lock the self-locking block 588 at the position to which the self-locking block 588 is pushed so that the self-locking block 588 cannot restore to its original position, that is, changes to the locked state, and the lock pin 525 is lifted up upward to leave the locking hole 419 of the second locking slider 318 (that is, unlocked position); when the self-locking block 588 in the locked state is pushed forward, the pushing mechanism 587 can unlock the self-locking block 588, so that the self-locking block 588 restores to its original position, that is, changes to the unlocked state, and the lock pin 525 is laid down and inserted into the locking hole 419 of the second locking slider 318 (that is, the locked position). As an embodiment, the pushing mechanism 587 may be implemented in various manners, for example, a "ballpoint-pen refill pushing mechanism." The switch box 205 has two states: an unlocked state (corresponding to the unlocked position of the lock pin 525) and a locked state (corresponding to the locked position of the lock pin 525). The mechanical reversing means is configured to change or maintain the current state of the switch box 205.

In normal conditions, when the electrical appliance enters a door open state, the circuit board (not shown) of the electrical appliance sends a pulse driving signal to the switch box 205, and drives the self-locking block 588 through the electronic driving means 1150, to drive the lock pin 525 to lift up (that is, leave the locking hole 419 on the second locking slider 318) to jack up the elastic piece 524, so as to disconnect the working circuit of the electrical appliance, and unlock the second locking slider 318 to release the cam 208, so as to allow the door of the electrical appliance to be opened through an external force.

When the door of the electrical appliance is forcibly opened, that is, when the lock pin 525 is still inserted in the locking hole 419 of the second locking slider 318, the external force forcibly pulls out the door hook 102 of the electrical appliance. In this case, by causing the swing lever 526 to rotate to its working position, the working circuit of the electrical appliance can also be disconnected immediately.

FIG. 6 is a schematic perspective structural view illustrating a rear side of the switch box 205, the driving slider 311 and the second locking slider 318, to illustrate the position relationship between the driving slider 311, the second locking slider 318, and the switch box 205 and illustrate the assembly direction of the driving slider 311 and the second locking slider 318. As shown in FIG. 6, the bottom portion of the switch box 205 is provided with a hole 630, and an end portion of the swing lever 526 (see FIG. 7A to FIG. 7B for a specific structure of the swing lever 526) extends toward the outside of the switch box 205 through the hole 630. The size of the hole 630 is larger than the end portion of the swing lever 526, so that after extending outward through the hole 630, the end portion of the swing lever 526 still can move in a certain range. The part that the end portion of the swing lever 526 extends outward can be driven by the driving slider 311 from the outside of the switch box 205, to cause the swing lever 526 to rotate.

As can be seen from FIG. 6, an end portion of the lock pin 525 also extends outward from the bottom portion of the switch box 205. When the lock pin 525 moves vertically, the extending portion can be inserted into and withdrawn from the locking hole 419.

The driving slider 311 is disposed on a rear side of the switch box 205 along the width direction (that is, the direction y) of the switch box 205, and is configured to cooperate with the swing lever 526. Similarly, the second locking slider 318 and the driving slider 311 are disposed side by side on the rear side of the switch box 205 and is configured to cooperate with the lock pin 525.

Figure 7A:
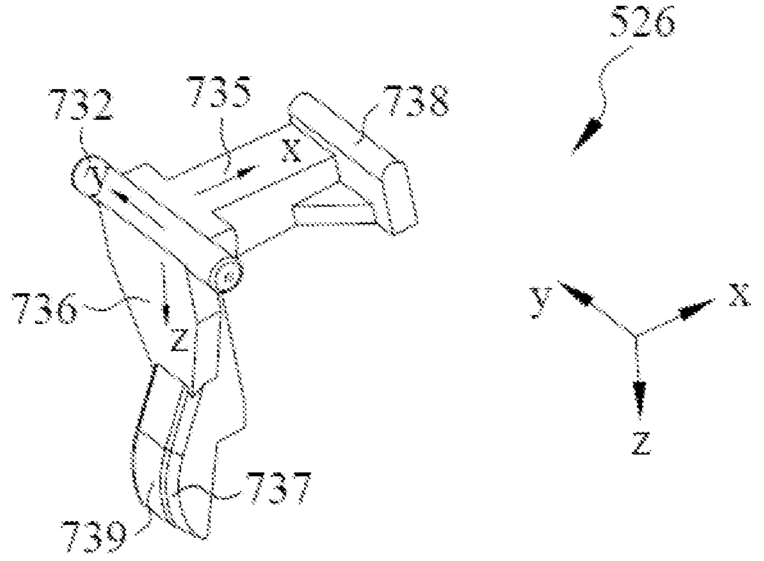
FIG. 7A to FIG. 7B are schematic perspective structural views of the swing lever 526 from two different angles.
Figure 7B:
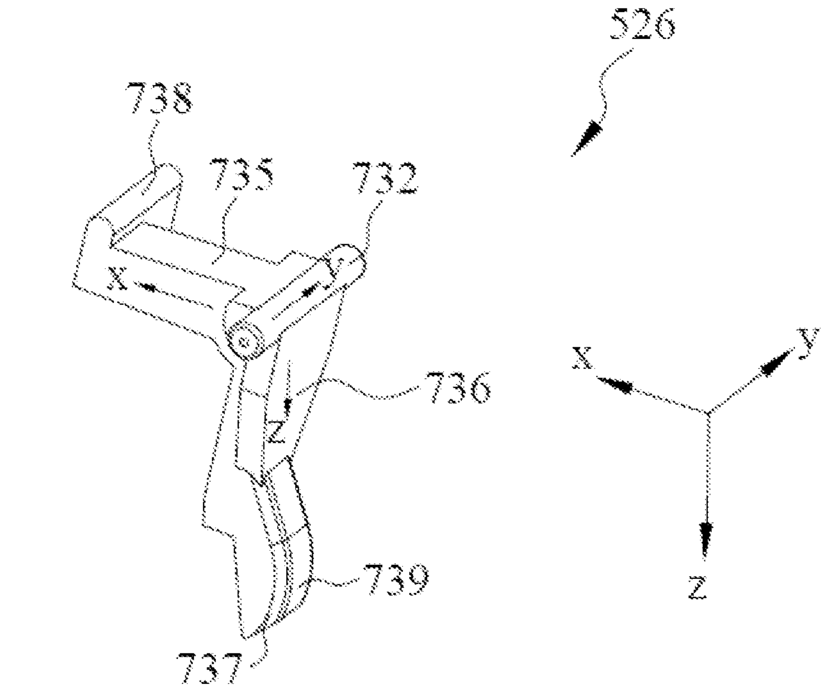

FIG. 7A to FIG. 7B are schematic perspective structural views of the swing lever 526 from two different angles, to illustrate the specific structure of the swing lever 526.

As shown in FIG. 7A to FIG. 7B, the swing lever 526 includes a shaft 732, an upper arm 735 and a lower arm 736. The upper arm 735 and the lower arm 736 are connected to the shaft 732.

When receiving a force, the lower arm 736 actuates the upper arm 735 to rotate about the shaft 732 together. The swing lever 526 is accommodated in the chamber 531, one end of the upper arm 735 can come into contact with the elastic piece 524, and one end of the lower arm 736 extends out of the switch box 205 through the hole 630, so that the driving slider 311 outside the switch box 205 can drive the lower arm 736.

In the example shown in FIG. 7A to FIG. 7B, the upper arm 735 and the lower arm 736 are bent at the shaft 732 and are substantially perpendicular to each other. As an example, the shaft 732 is disposed parallel to the driving slider 311 along the direction y, the upper arm 735 is disposed along the direction x, and the lower arm 736 is disposed along the direction z. When the swing lever 526 is at the working position, the upper arm 735 jacks up the elastic piece 524, to open the switch means 520; when the swing lever 526 is at the idle position, the lower arm 736 retracts, and does not affect the closing or opening of the switch means 520.

Specifically, an end portion of the upper arm 735 is further provided with a protrusion 738. The protrusion 738 protrudes upward and is configured for contact with the elastic piece 524. In the example shown in FIG. 7A to FIG. B, the protrusion 738 extends along the direction y by a certain length to exceed the width of the upper arm 735. The protrusion 738 has a length close or equal to the width of the elastic piece 524, so that when the swing lever 526 applies a force to the elastic piece 524, the elastic piece 524 receives the force uniformly. Of course, the length of the protrusion 738 may also be set otherwise or the protrusion 738 may be omitted, as long as one end of the upper arm 735 can come into contact with the elastic piece 524 to jack up the elastic piece 524.

As an embodiment, an end portion of the lower arm 736 is further provided with a curved handle 739, to increase contact points on the lower arm 736 for contact with the driving slider 311. An edge of the curved handle 739 has a chamfer 737. The chamfer 737 is complementary to a swing lever driving chamfer 843 of the driving slider 311 (referring to FIG. 8A to FIG. 8B), so that the driving slider 311 can drive the lower arm 736, so as to cause the swing lever 526 to rotate. The specific manner in which the swing lever 526 is driven will be described in detail below with reference to the specific structure of the driving slider 311.

Figure 8A:
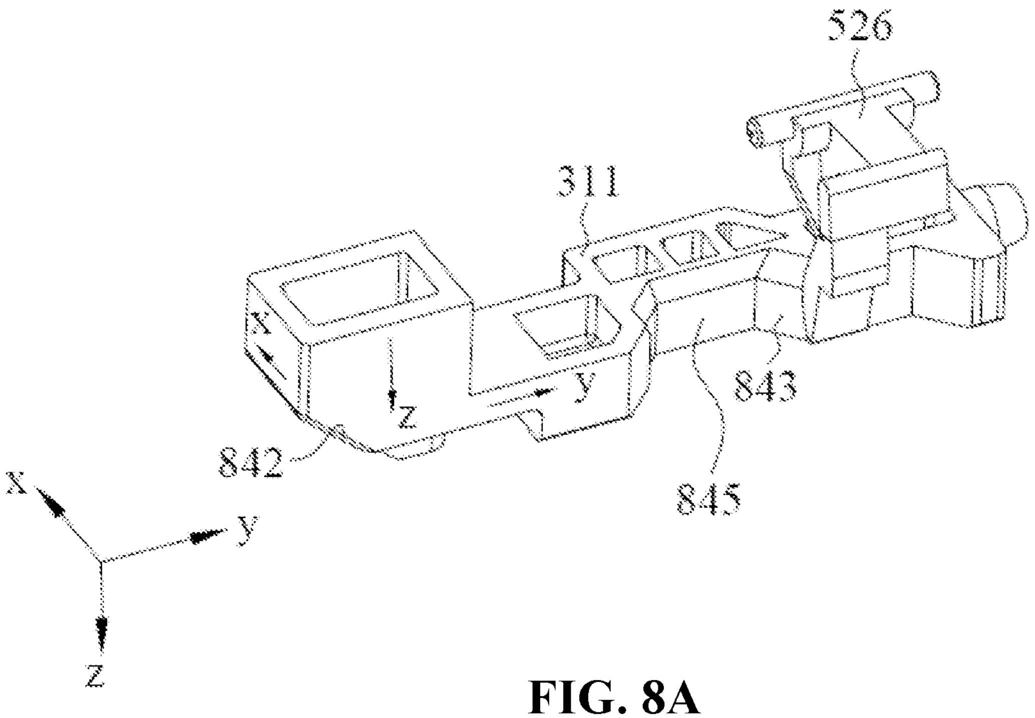
FIG. 8A to FIG. 8B are schematic structural views illustrating two cooperation relationships between the swing lever 526, the driving slider 311 and the door hook 102.
Figure 8B:
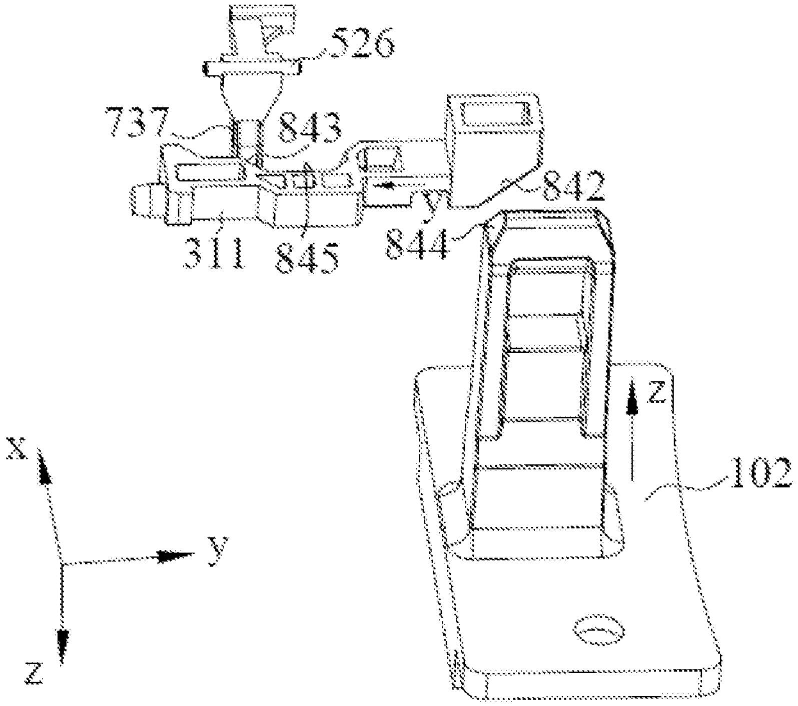

FIG. 8A to FIG. 8B are schematic structural views illustrating two cooperation relationships between the swing lever 526, the driving slider 311 and the door hook 102. FIG. 8A is a rear view illustrating the cooperation relationship between the driving slider 311 and the swing lever 526; FIG. 8B is a front view illustrating the cooperation relationship between the swing lever 526, the driving slider 311 and the door hook 102.

As shown in FIG. 8A to FIG. 8B, the driving slider 311 is substantially elongated, has a length extending along the direction y, and is movable along the direction y. A side surface of the driving slider 311 has the swing lever driving chamfer 843, and the chamfer 737 on the lower arm 736 of the swing lever 526 presses against the swing lever driving chamfer 843 of the side surface of the driving slider 311, and the chamfer 737 and the swing lever driving chamfer 843 have complementary shapes. In addition, the driving slider 311 has a door lock driving chamfer 842 at a lower part of a front end thereof. The door lock driving chamfer 842 is vertically inclined along a front-to-rear direction, so that the door lock driving chamfer 842 forms an obtuse angle with a bottom surface of the driving slider 311. An end portion of the door hook 102 has a chamfer 844 matching with the door lock driving chamfer 842. The chamfers can form complementary contact surfaces when pressing against each other.

Therefore, when the door hook 102 is inserted into the door lock hole 103, the chamfer 844 of the door hook 102 presses against the door lock driving chamfer 842 of the driving slider 311, so that the chamfer 844 of the door hook 102 applies a force to the door lock driving chamfer 842 of the driving slider 311, a component force generated on the two complementary chamfers pushes the driving slider 311 to move from its locked position toward its unlocked position along the direction y, and the driving slider 311 compresses the spring 312; when the door hook 102 is pulled out from the door lock hole 103, the chamfer 844 of the door hook 102 releases the force applied to the door lock driving chamfer 842 of the driving slider 311, and the spring 312 pushes the driving slider 311 to move from its unlocked position toward its locked position along the direction y.

The side surface of the driving slider 311 has a recessed portion 845 recessed along the direction x, and the swing lever driving chamfer 843 is disposed on a side surface of the recessed portion 845. When the driving slider 311 is at the driving slider unlocked position (that is, the door hook 102 is inserted into the door lock hole 103), the recessed portion 845 is configured to accommodate the lower arm 736 of the swing lever 526; when the driving slider 311 is at the driving slider locked position (that is, the door hook 102 is pulled out from the door lock hole 103), the lower arm 736 of the swing lever 526 presses against the non-recessed part of the driving slider 311.

Therefore, when the driving slider 311 moves from its locked position toward its unlocked position along the direction y, the swing lever driving chamfer 843 of the driving slider 311 applies a force to the chamfer 737 of the lower arm 736 of the swing lever 526, and a component force generated on the two complementary chamfers pushes the lower arm 736 of the swing lever 526 to rotate anti-clockwise, so that the swing lever 526 rotates from its idle position to its working position, and the upper arm 735 of the swing lever 526 overcomes the elastic force of the elastic piece 524 to jack up the elastic piece 524 (that is, open the switch means 520); when the driving slider 311 moves from its unlocked position toward its locked position along the direction y, the swing lever driving chamfer 843 of the driving slider 311 releases the force applied to the chamfer 737 of the lower arm 736 of the swing lever 526, and the elastic piece 524 applies the elastic force to the upper arm 735 of the swing lever 526, to cause the swing lever 526 to rotate clockwise and the upper arm 735 of the swing lever 526 to retract downward, so that the swing lever 526 rotates from its working position to its idle position, and does not affect the closing or opening of the switch means 520.

Therefore, when the driving slider 311 is at the driving slider locked position (that is, the door hook 102 is pulled out of the door lock hole 103), the swing lever 526 is at the working position, to ensure that the switch means 520 can be opened. When the driving slider 311 is at the driving slider unlocked position (that is, the door hook 102 is inserted into the door lock hole 103), the swing lever 526 is at the idle position, and does not affect the control of the switch means 520 by the lock pin 525.

Figure 9A:
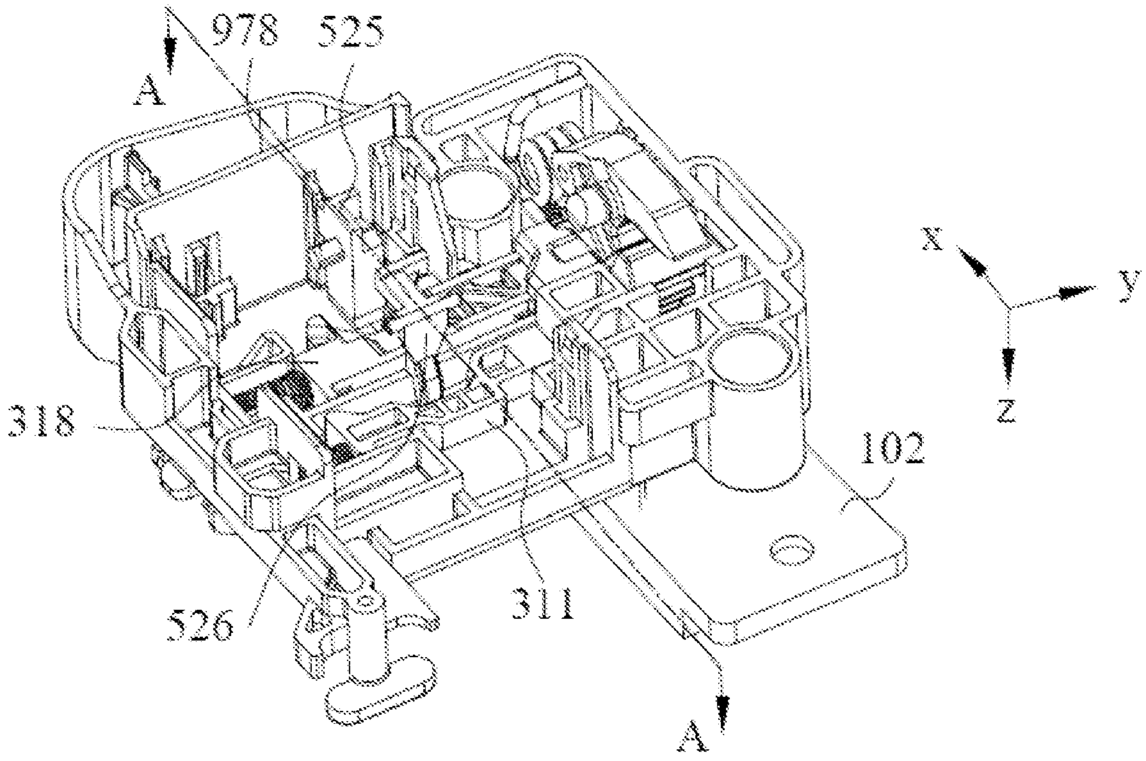
FIG. 9A to FIG. 9C are schematic structural views illustrating cooperation between the locking slider means 310, the driving slider 311, the lock pin 525 and the swing lever 526 when the door hook 102 are in three different positions.
Figure 10A:
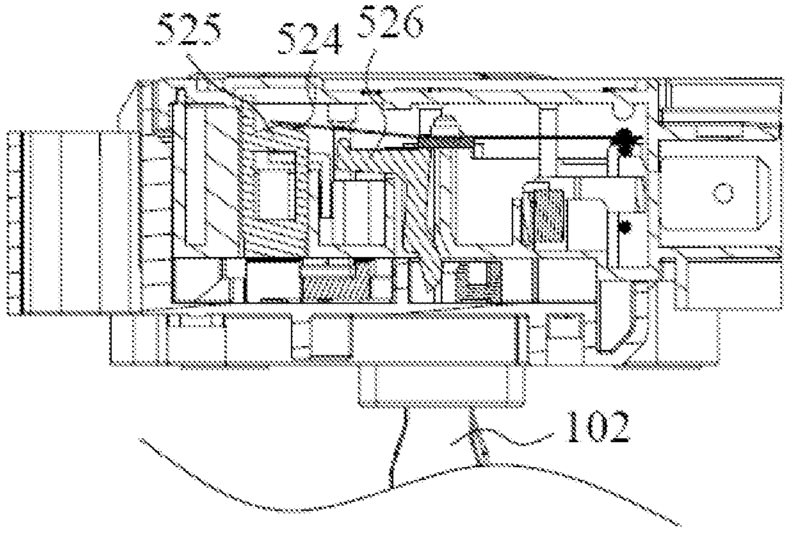
FIG. 10A to FIG. 10C are three cross-sectional views taken along lines A-A, B-B and C-C corresponding to the three different positions of the door hook 102 in FIG. 9A to FIG. 9C.
Figure 9B:
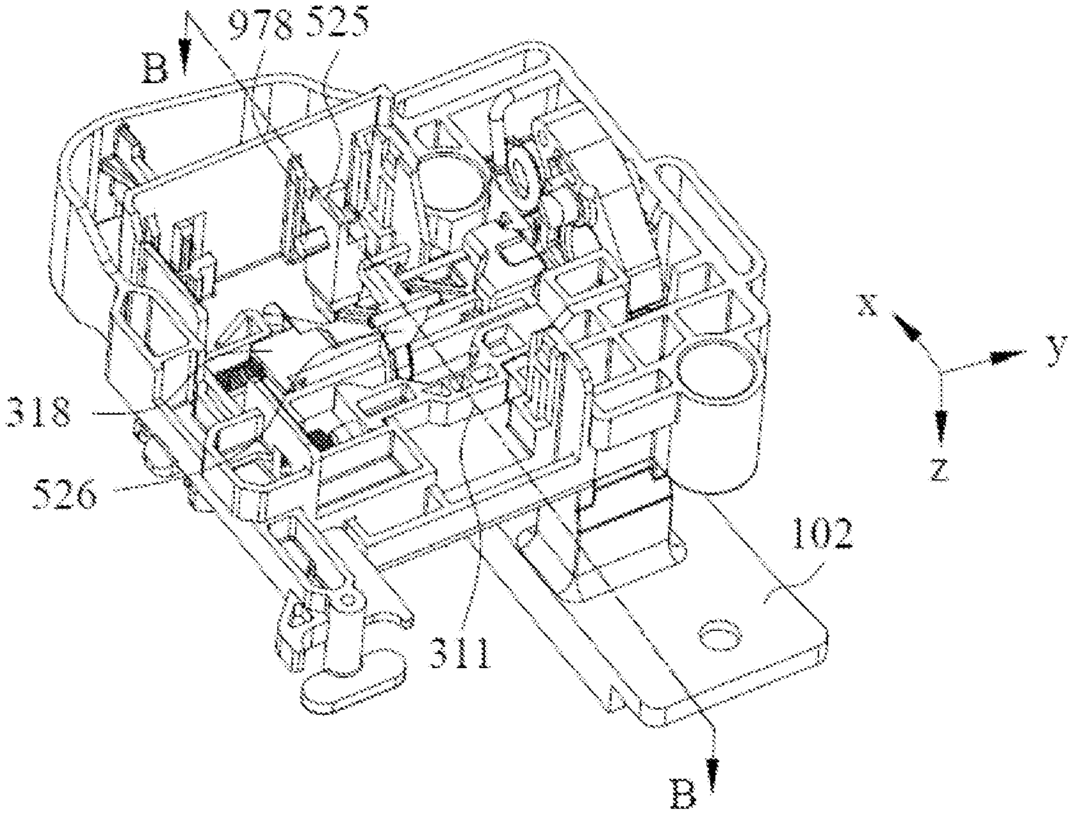
Figure 10B:
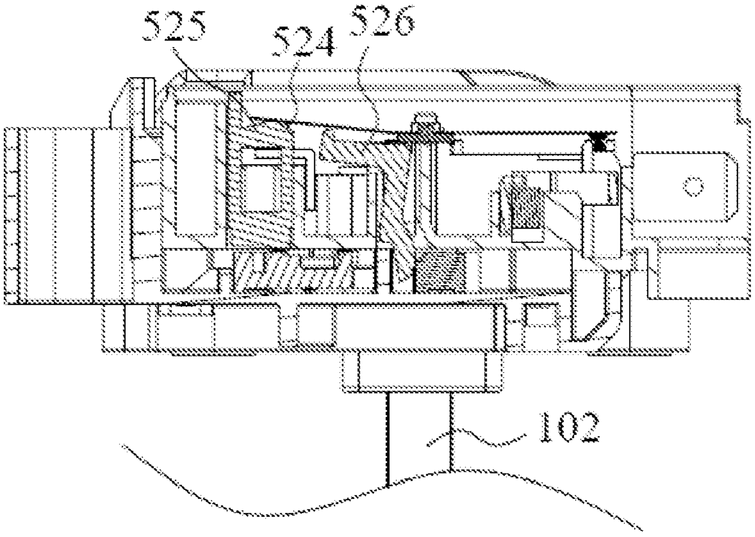
Figure 9C:
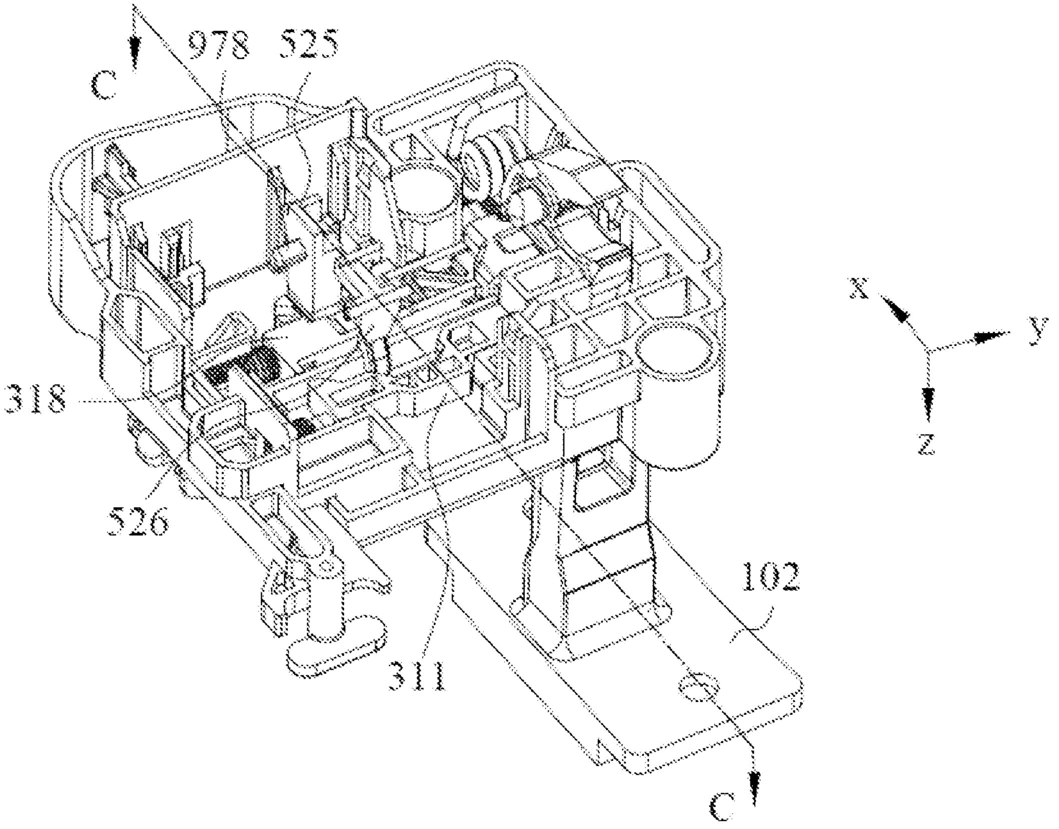
Figure 10C:
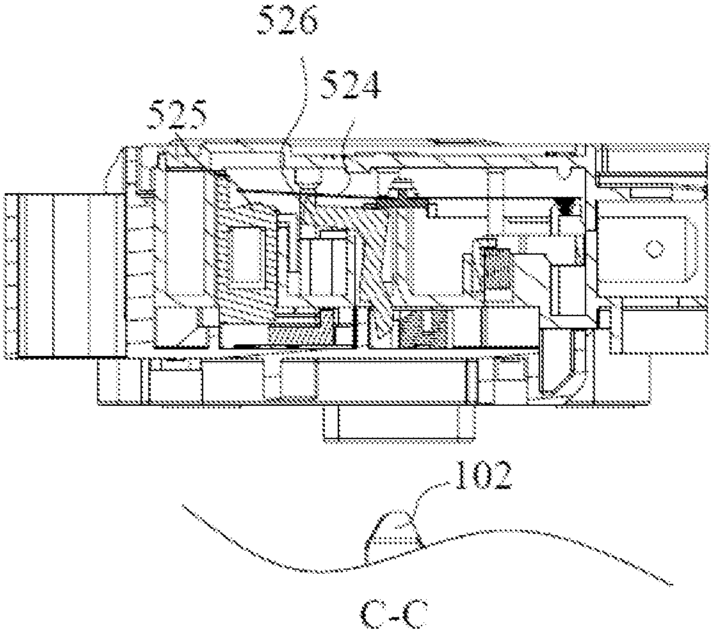

FIG. 9A to FIG. 9C are schematic structural views illustrating cooperation between the locking slider means 310 (the first locking slider 417 and the second locking slider 318), the driving slider 311, the lock pin 525 and the swing lever 526 when the door hook 102 are in three different positions (the door hook 102 is completely inserted into the door lock hole 103, the door hook 102 is partially pulled out of the door lock hole 103, and the door hook 102 is completely pulled out of the door lock hole 103). FIG. 10A to FIG. 10C are three cross-sectional views taken along lines A-A, B-B and C-C corresponding to the three different positions of the door hook 102 in FIG. 9A to FIG. 9C, to illustrate the cooperation relationship between the elastic piece 524, the lock pin 525 and the swing lever 526. FIG. 9A and FIG. 10A illustrate the cooperation relationship between the components when the door hook 102 is completely inserted into the door lock hole 103; FIG. 9B and FIG. 10B illustrate the cooperation relationship between the components when the door hook 102 is partially pulled out of the door lock hole 103 during normal opening of the door; FIG. 9C and FIG. 10C illustrate the cooperation relationship between the components when the door hook 102 is completely pulled out of the door lock hole 103 during forced opening of the door with an external force.

The state shown in FIG. 9A is as follows: the electrical appliance stops running, and the door hook 102 is inserted into the door lock hole 103, to close the door of the electrical appliance. As shown in FIG. 9A, the door hook 102 pushes the cam 208 to rotate to its locked position, and a lower end of the cam 208 is inserted into the hole 181 of the door hook 102 to hook the door hook 102. The rotation of the cam 208 causes the first locking slider 417 to move to its locked position, and the first locking slider 417 pushes the second locking slider 318 to move to its locked position, so that the locking hole 419 on the second locking slider 318 is exactly aligned with the lock pin 525, but the lock pin 525 has not been inserted downward into the locking hole 419, and the lock pin 525 is still at the lock pin unlocked position, and jacks up the elastic piece 524, so as to open the switch means 520. Only after a switch button of the electrical appliance is pressed and a control circuit in the switch box 205 sends a driving signal, can the self-locking block 588 drive the lock pin 525 to move downward to its locked position along the direction z (that is, inserted into the locking hole 419), so that the second locking slider 318 is locked, and that the first locking slider 417 and the cam 208 are also locked, and the door hook 102 is hooked by the cam 208 and cannot be pulled out, thereby locking the door of the electrical appliance.

In the state shown in FIG. 9A, the door hook 102 presses against a front end of the driving slider 311, to push the driving slider 311 to its unlocked position, so that the swing lever 526 moves to its idle position.

Corresponding to FIG. 9A, FIG. 10A is a cross-sectional view illustrating the state inside the switch box 205. In this case, the swing lever 526 is at its idle position, and does not jack up the elastic piece 524. The lock pin 525 is at the lock pin unlocked position, and jacks up the elastic piece 524, to open the switch means 520. Only after the control circuit in the switch box 205 sends a driving signal, the lock pin 525 moves downward to its locked position (that is, is inserted into the locking hole 419), and no longer jack up the elastic piece 524. After the lock pin 525 is at the lock pin locked position, neither the swing lever 526 nor the lock pin 525 jacks up the elastic piece 524, the elastic piece 524 moves downward under the action of the elastic force, and the movable contact 586 comes into contact with the stationary contact 523, to close the switch means 520, and connect the working circuit of the electrical appliance, so that the electrical appliance can start running.

The state shown in FIG. 9B is as follows: the electrical appliance stops running, and during normal opening of the door, the door hook 102 is partially pulled out of the door lock hole 103, to open the door of the electrical appliance. As shown in FIG. 9B, when the electrical appliance stops running, the circuit board (not shown) of the electrical appliance sends a power-down signal, the electronic driving means in the switch box 205 drives the lock pin 525 through the self-locking block 588 to lift up along the direction z to leave the locking hole 419, and the lock pin 525 moves to its unlocked position, and jacks up the elastic piece 524. The movement of the lock pin 525 unlocks the second locking slider 318, and also unlocks the first locking slider 417 and the cam 208. When pulled out of the door lock hole 103, the door hook 102 can drive the cam 208 to rotate, so that the cam 208 leaves its locked position (or moves to its unlocked position).

In the state shown in FIG. 9B, the door hook 102 no longer presses against the front end of the driving slider 311, and the driving slider 311 moves to its locked position under the action of the elastic force of the spring 312, so that the swing lever 526 moves to its working position.

Corresponding to FIG. 9B, FIG. 10B is a cross-sectional view illustrating the state in the switch box 205. In this case, the swing lever 526 is at the swing lever working position, the lock pin 525 is at the lock pin unlocked position, and both the two jack up the elastic piece 524, to open the switch means 520, and disconnect the working circuit of the appliance, so that the electrical appliance stops running.

Therefore, as can be seen from FIG. 9A to FIG. 9B and FIG. 10A to FIG. 10B, when the lock pin 525 is at the unlocked position, it is ensured that the switch means 520 is opened. When the lock pin 525 is at the unlocked position, the swing lever 526, whether at the working position or at the idle position, does not affect the opening of the switch means 520.

However, during running of the electrical appliance, if the door is forcibly pulled with an external force, or even the cam 208 in the door lock 100 is damaged to open the door of the electrical appliance, the running of the electrical appliance needs to be stopped immediately to ensure safety. Therefore, the swing lever 526 needs to disconnect the working circuit of the electrical appliance immediately. The working principles of the swing lever 526 disconnecting the working circuit will be described with reference to cases shown in FIG. 9C and FIG. 10C.

The state shown in FIG. 9C is as follows: the electrical appliance is running, and during abnormal opening of the door, that is, when the door of the electrical appliance is forcibly pulled open with an external force (or an internal thrust), the door of the electrical appliance is opened. In this case, the control circuit has not driven the lock pin 525 to move upward to its unlocked position (that is, driven the lock pin 525 to leave the locking hole 419); therefore the lock pin 525 is still at the lock pin locked position, the second locking slider 318 is still locked by the lock pin 525, and the first locking slider 417 and the cam 208 are also locked. When the external force is large enough, the cam 208 is pulled apart, damaging the door lock 100, and the door of the electrical appliance is forcibly opened.

In this case, as shown in FIG. 9B, the door hook 102 no longer presses against the front end of the driving slider 311, and the driving slider 311 moves to its locked position under the action of the elastic force of the spring 312, so that the swing lever 526 moves to its working position.

Corresponding to FIG. 9C, FIG. 10C is a cross-sectional view illustrating the state inside the switch box 205. In this case, the lock pin 525 is at the lock pin locked position and does not jack up the elastic piece 524. However, the swing lever 526 is at the swing lever working position and can jack up the elastic piece 524, to open the switch means 520, and disconnect the working circuit of the electrical appliance, so that the electrical appliance stops running.

Figure 11A:
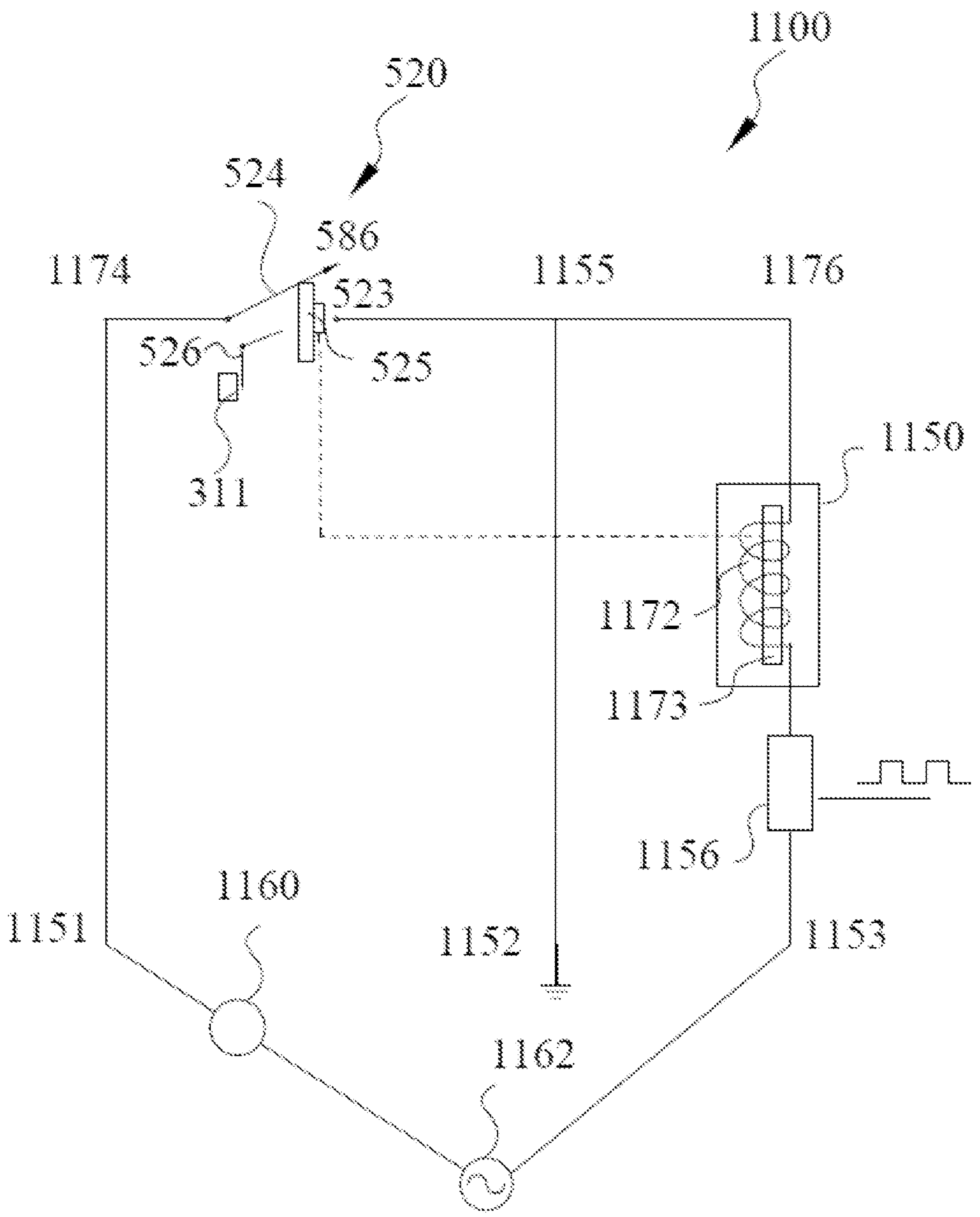
FIG. 11A to FIG. 11D are schematic views of a control circuit 1100 in different states.
Figure 11B:
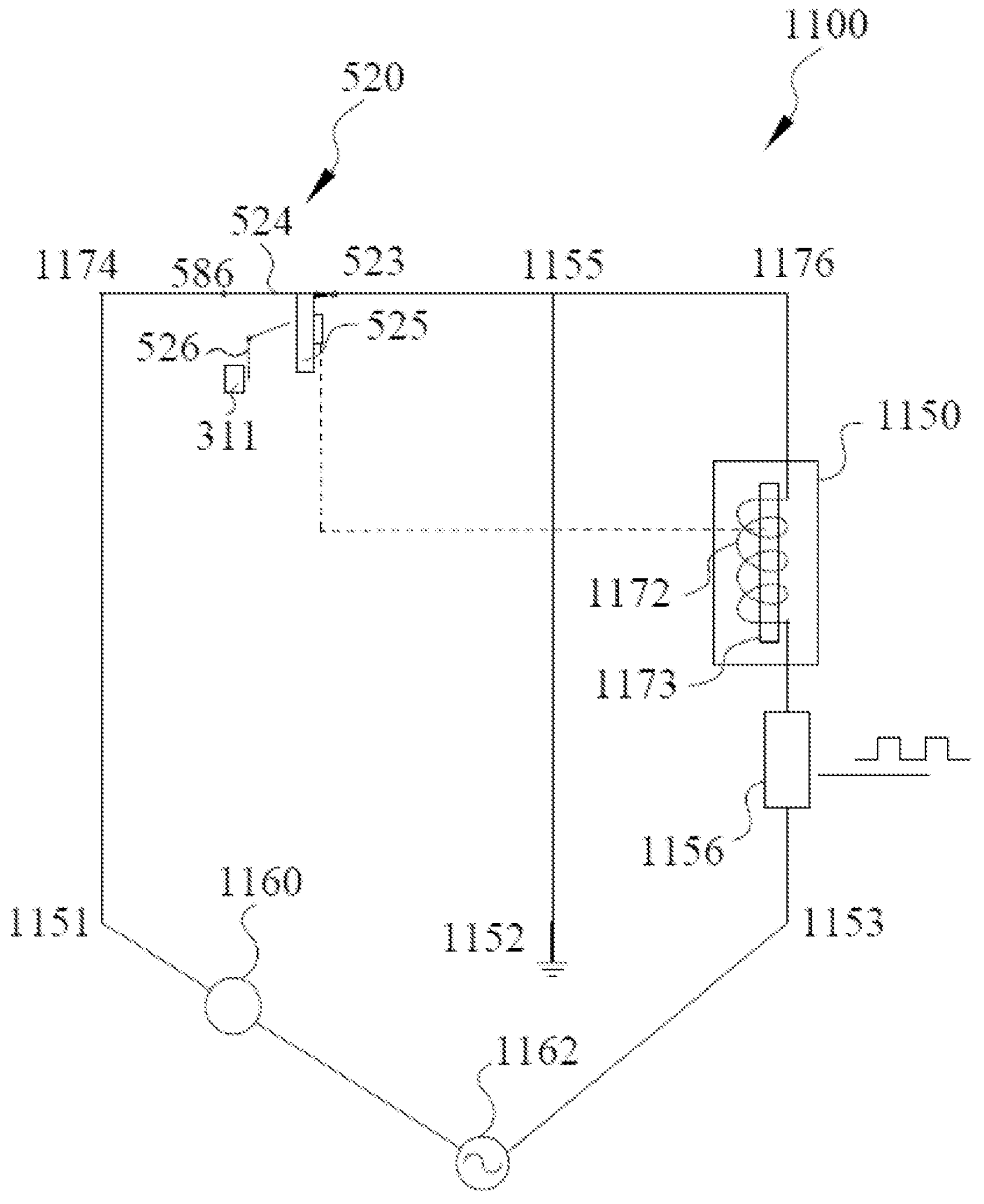
Figure 11C:
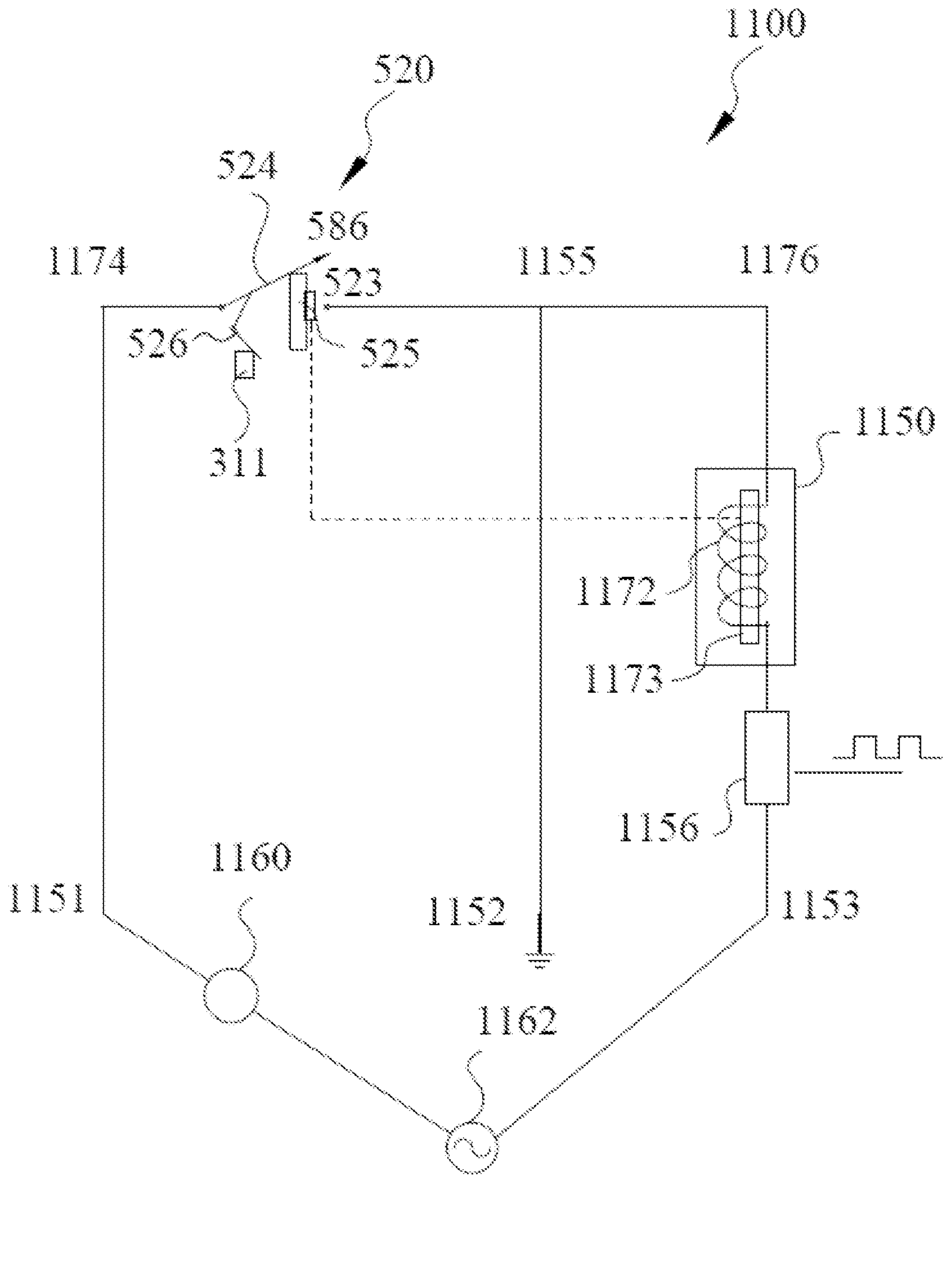
Figure 11D:
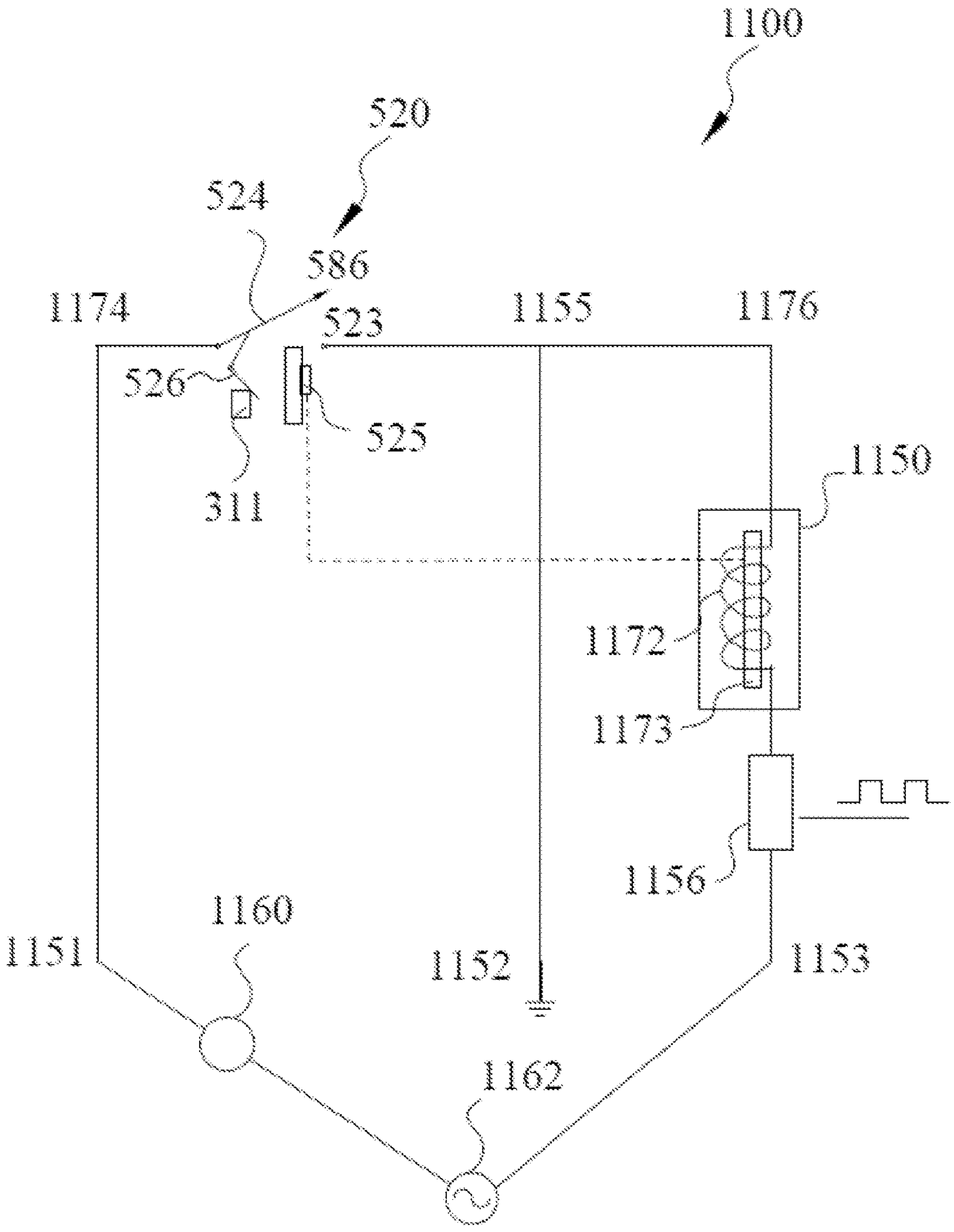

FIG. 11A to FIG. 11D are schematic views of a control circuit 1100 in different states. FIG. 11A illustrates the control circuit 1100 when the lock pin 525 is at the unlocked position, the swing lever 526 is at the idle position, and the switch means 520 is opened; FIG. 11B illustrates the control circuit 1100 when the lock pin 525 is at the locked position, the swing lever 526 is at the idle position, and the switch means 520 is closed; FIG. 11C illustrates the control circuit 1100 when the lock pin 525 is at the unlocked position, the swing lever 526 is at the working position, and the switch means 520 is opened; FIG. 11D illustrates the control circuit 1100 when the lock pin 525 is at the locked position, the swing lever 526 is at the working position, and the switch means 520 is opened.

As shown in FIG. 11A to FIG. 11D, the control circuit 1100 includes a first current loop (working loop) and a second current loop (control loop). A first current loop is formed between a connection terminal 1151 and a common terminal 1152 through the switch means 520. A second current loop is formed between a control terminal 1153 and the common terminal 1152 through the electronic driving means 1150 and a startup means 1156. The first current loop and the second current loop are connected to the common terminal 1152 through a common connection point 1155.

The connection terminal 1151 may be connected in series with a power supply 1162 in the first current loop through an electric motor 1160 (or motor or other driving portion). The two contacts 586 and 523 of the switch means 520 are respectively connected to the first current loop through connection points 1174 and 1155. Closing or opening of the switch means 520 is used to control connection or disconnection of the first current loop, so as to control the connection or disconnection of the electric motor 1160 to or from the power supply 1162. The electronic driving means 1150 and the startup means 1156 are respectively connected to the second current loop through the control terminal 1153 and a connection point 1176 and are further connected to the power supply 1162. The common terminal 1152 is connected to a ground of the power supply 1162. The startup means 1156 may receive a control signal (or driving signal) sent from the circuit board of the electrical appliance, and close (excite) the electronic driving means 1150 according to the received control signal (or driving signal), so that the lock pin 525 moves upward or downward to control locking or unlocking of the second locking slider 318, so as to control locking or unlocking of the first locking slider 417 and the cam 208. In addition, the upward or downward movement of the lock pin 525 also can participate in controlling opening or closing of the switch means 520.

The electronic driving means 1150 includes a coil 1172 and an iron core 1173. When the electronic driving means 1150 is connected to the second current loop, the coil 1172 is electrified so that the iron core 1173 moves under the action of an electromagnetic force. The lock pin 525 is provided with a shoulder 978 (referring to FIG. 9A to FIG. 9C). When the iron core 1173 drives the self-locking block 588 to reciprocally move between the locked state and the unlocked state, the self-locking block 588 drives the shoulder 978 of the lock pin 525 to actuate the lock pin 525 to vertically move upward, so as to lock or unlock the cam 208, and participate in closing or opening of the switch means 520.

In the state shown in FIG. 11A, the door of the electrical appliance changes from an open position to a closed position, and the door hook 102 is partially inserted into the door lock hole 103, so that the swing lever 526 is at the idle position. Because the electrical appliance has not been started, the lock pin 525 is still in its unlocked position (that is, outside the locking hole 419), and jacks up the elastic piece 524, to open the switch means 520, so that the electrical appliance stops running.

In the state shown in FIG. 11B, after the door of the electrical appliance is closed, the electrical appliance is started (for example, after a user presses a start button), the lock pin 525 moves from its unlocked position to its locked position (that is, is inserted into the locking hole 419), and the lock pin 525 leaves the switch means 520, so that the switch means 520 is closed, and the electrical appliance works normally. In addition, the driving slider 311 causes the swing lever 526 to move to its idle position and does not affect the closed state of the switch means 520.

Specifically, the startup means 1156 receives a driving (control) pulse signal (the first driving pulse signal) from the driving means (the circuit board of the electrical appliance), and the startup means 1156 is closed, to connect the power supply 1162 to the coil 1172, so that the coil 1172 is in an excited state, and the iron core 1173 in the coil 1172 drives the self-locking block 588 to move once to actuate the lock pin 525 to move, and the lock pin 525 moves from the unlocked position to the locked position, and the lock pin 525 moves downward to leave the elastic piece 524, so as to close the switch means 520. It should be noted that after the circuit board (the driving means) of the electrical appliance sends the first pulse, the state inside the switch box 205 changes, from the unlocked state (the lock pin 525 is at the unlocked position) to the locked state (the lock pin 525 is driven from the unlocked position to the locked position). However, the circuit board (the driving means) of the electrical appliance does not need to maintain the pulse signal to maintain the current state of the switch box 205, because the ballpoint-pen refill pushing mechanism 587 (located in the self-locking block 588) in the switch box 205 can maintain the current state (the locked state) of the switch box 205. However, after the circuit board (the driving means) of the electrical appliance sends the next (second) pulse (referring to FIG. 11C), the ballpoint-pen refill pushing mechanism 587 in the switch box 205 changes the switch box 205 from the locked state (that is, the lock pin 525 is at the locked position) to the unlocked state (that is, the lock pin 525 is driven from the locked position to the unlocked position).

In the state shown in FIG. 11C, the door of the electrical appliance is normally open, the switch means 520 is opened, and the electrical appliance is normally powered down. In this case, on one hand, the driving slider 311 drives the swing lever 526 to rotate to its working position, so that the swing lever 526 jacks up the elastic piece 524, to open the switch means 520. On the other hand, the lock pin 525 can be driven by the electronic driving means 1150 to move to its unlocked position (that is, be pulled out of the locking hole 419) and jack up the elastic piece 524 to open the switch means 520.

Specifically, after the electrical appliance normally stops working and before the door of the electrical appliance is opened, the startup means 1156 receives the next (second) driving pulse signal from the driving means (the circuit board of the electrical appliance), and the startup means 1156 is closed, to connect the power supply 1162 to the coil 1172, so that the coil 1172 is in an excited state, and the iron core 1173 in the coil 1172 drives the self-locking block 588 to move once again to actuate the lock pin 525 to move, and the lock pin 525 moves upward from the locked position to the unlocked position, and the lock pin 525 jacks up the elastic piece 524, so as to open the switch means 520. In this case, the door of the electrical appliance can be opened. After the circuit board of the electrical appliance (that is, the driving means) sends the second pulse, the ballpoint-pen refill pushing mechanism 587 in the switch box 205 changes the switch box 205 from the locked state (that is, the lock pin 525 is at the locked position) to the unlocked state (that is, the lock pin 525 is driven from the locked position to the unlocked position). As shown in FIG. 11C, the swing lever 526 and the lock pin 525 may both be in contact with the elastic piece 524. Of course, in the state of FIG. 11C, the movement stroke of the lock pin 525 and the rotation stroke of the swing lever 526 may be set in such a manner that when the lock pin 525 jacks up the elastic piece 524, the swing lever 526 is not in contact with the elastic piece 524 even if the swing lever 526 is at the working position, and only the lock pin 525 is used to jack up the elastic piece 524.

As shown in FIG. 11D, the door of the electrical appliance is opened under abnormal conditions. For example, when the electrical appliance is running, the door hook 102 is forcibly pulled out of the door lock hole 103, and consequently when the cam 208 is broken, the switch means 520 is opened, and the electrical appliance is forcibly powered down. In this case, the lock pin 525 is not driven, is still at the lock pin locked position (that is, inserted into the locking hole 419), and does not affect the closed state of the switch means 520. According to the position of the door hook 102, the driving slider 311 drives the swing lever 526 to rotate to the swing lever working position, so that the swing lever 526 jacks up the elastic piece 524 to open the switch means 520.

Specifically, when the door of the electrical appliance is forcibly opened during running of the electrical appliance, the startup means 1156 does not receive any driving pulse signal from the circuit board (the driving means) of the electrical appliance, the coil 1172 is not excited, the self-locking block 588 does not move, the lock pin 525 is maintained at the locked position, and the pushing mechanism 587 in the switch box 205 maintains the switch box 205 in the locked state (that is, the lock pin 525 is maintained at the locked position). In the state shown in FIG. 11D, the lock pin 525 does not have the effect of disconnecting the elastic piece 524, but the swing lever 526 alone functions to jack up the elastic piece 524.

When the electrical appliance is working, that is, when the first current loop is closed, the self-locking block 588 is at the unlocked state, the lock pin 525 falls down to its locked position, the swing lever 526 is at its idle position, and the switch means 520 is closed. In the normal state, to open the first current loop to stop working, the circuit board (not shown) of the electrical appliance may send a pulse signal to the startup means 1156, so that the iron core 1173 in the electronic driving means 1150 pushes forward the self-locking block 588 under the action of the electromagnetic force. The self-locking block 588 moves forward and actuates the lock pin 525 to move upward, so as to jack up the switch means 520 to open the first current loop. Even if the pulse signal disappears, the self-locking block 588 is locked by the pushing mechanism 587 and cannot restore to its original position, and presses against the lock pin 525 to maintain the lock pin 525 at the position jacking up the switch means 520 and prevent the lock pin 525 from falling down, and the first current loop is always maintained in the open state. When a next pulse signal arrives, the electronic driving means 1150 pushes the self-locking block 588 forward again. In this case, the pushing mechanism 587 releases the self-locking block 588, so that self-locking block 588 restores to its original position, the lock pin 525 falls down accordingly, and the swing lever 526 is still at the idle position, thereby closing the switch means 520.

Therefore, the switch driving means (that is, the swing lever 526) and the lock pin 525 are capable of jointly controlling opening of the switch means 520. The switch driving means (that is, the swing lever 526) is driven by a mechanical structure (that is, the driving slider 311), and the lock pin 525 can be driven by a circuit structure (for example, the second current loop), to improve the sensitivity and reliability in disconnecting the power supply under abnormal working conditions.

In the embodiments of FIG. 11A to FIG. 11D, the startup means 1156 may be a relay device, or may be a thyristor or transistor. When the transistor is on, its emitter and collector connect the power supply 1162 to the coil 1172; when the transistor is off, its emitter and collector disconnect the power supply 1162 from the coil 1172. The base of the transistor receives a driving signal (or control signal). When the driving signal (or control signal) appears, the transistor is on; when the driving signal (or control signal) disappears, the transistor is off.

In FIG. 11A to FIG. 11D, in a normal working state of the electrical appliance, for example, closing the door first and then starting the electrical appliance, or stopping the electrical appliance first and then opening the door, the electronic driving means 1150 is used to drive the lock pin 525 to move vertically to close or open the switch means 520, so as to connect or disconnect the working circuit of the electrical appliance. However, in an abnormal state of the electrical appliance, the lock pin 525 does not open the switch means 520, and only the swing lever 526 is used to open the switch means 520, to implement forcible power-down. As long as the door hook 102 is inserted into the door lock hole 103, the swing lever 526 will not rotate to its working position to open the switch means 520; as long as the door lock hole 103 is pulled out of the door hook 102, the swing lever 526 will rotate to open the switch means 520. Therefore, the swing lever 526 is configured to open the switch means 520 only in the abnormal state. In the normal state, the swing lever 526 does not affect the control of the switch means 520 by the lock pin 525.

According to the present application, by means of the driving slider 311 and the swing lever 526 coupled with the door book 102, the working circuit of the electrical appliance can be cut off in time when the door of the electrical appliance is abnormally opened, so as to stop the operation of the electrical appliance. The above configuration of the present application not only can open the switch means with higher sensitivity, but also provides higher reliability, and can stop the operation of the electrical appliance in time even if other components in the door lock are damaged.

It should be noted that, the spirit and principles of the present application are not intended to be limited by the embodiments of the swing lever and the driving slider disclosed in the present application. It should be appreciated by those skilled in the art that the switch driving means and the driving slider in the embodiments of the present application may be other mechanical structures having the same or similar functions, so as to directly drive the closing or opening of the switch means by means of the movement of the door hook 102.

Although the present application is described with reference to specific embodiments shown in the accompanying drawings, it should be appreciated that without departing from the spirit and scope taught by the present application, the configuration of the door lock of the present application, especially, the configuration of the switch driving means and the driving slider, may have many variations. Those skilled in the art should appreciate that the structures in the embodiments disclosed by the present application may be changed in different manners, and all such changes fall within the spirit and scope of the present application and the appended claims.

The invention claimed is:

1. A door lock, comprising:

a switch means that defines open and closed positions and includes a pair of contacts, wherein the switch means defines a vertical movement path along which the switch means moves to separate the contacts to move to the open position or engage the contacts to move to the closed position;

a switch driving means that is configured to rotate about a rotational axis from a first position to a second position to engage and move the switch means to its open position for opening the switch means, the switch driving means having an L-shaped body including an upper arm and a lower arm that extend from the rotational axis and generally perpendicularly with respect to each other; and a driving slider with a first slider segment at a first end and a second slider segment at a second end, wherein the driving slider is capable of driving the switch driving means to rotate from its first position to its second position by sliding engagement of the first slider segment and the switch driving means, and the driving slider is capable of being driven by sliding engagement of the second slider segment and a door hook; and wherein:

during movement of the switch driving means to rotate from its first position to its second position:

the lower arm of the switch driving means L-shaped body moves in a horizontal movement path;

the upper arm of the switch driving means L-shaped body moves in a vertical movement path; and the upper arm of the switch driving means L-shaped body engages the switch means and moves the switch means in its open position and separates the contacts from each other.

2. The door lock according to claim 1, wherein the switch driving means is a swing lever, and the swing lever is capable of rotating to open the switch means.

3. The door lock according to claim 2, wherein the door lock further comprises:

a cam, wherein the cam is capable of receiving the door hook, and the cam has a locked position;

a locking slider means, wherein the locking slider means is configured to maintain the cam at the locked position; and a lock pin, wherein the lock pin is configured to lock the locking slider means.

4. The door lock according to claim 3, wherein the lock pin has a lock pin locked position and a lock pin unlocked position, wherein when the lock pin is at the lock pin locked position, the lock pin locks the locking slider means; and when the lock pin is at the lock pin unlocked position, the lock pin releases the locking slider means and opens the switch means.

5. The door lock according to claim 4, wherein under normal working conditions, the lock pin is capable of opening the switch means; and in the case of forced door pulling, the switch driving means is capable of opening the switch means.

6. The door lock according to claim 5, wherein the locking slider means comprises:

a first locking slider and a second locking slider, wherein the first locking slider is capable of being driven by the cam to move along a first direction (x), and the first locking slider is capable of driving the second locking slider to move along a second direction (y);

the lock pin is configured to lock the second locking slider; and the first direction (x) is perpendicular to the second direction (y).

7. The door lock according to claim 2, wherein the switch means comprises:

an elastic piece; and a stationary contact; wherein one end of the swing lever is capable of driving the elastic piece;

the swing lever has a swing lever working position and a swing lever idle position, wherein when the swing lever is at the swing lever working position, the swing lever detaches the elastic piece from the stationary contact, so as to open the switch means; and when the swing lever is at the swing lever idle position, the swing lever does not affect closing or opening of the switch means.

8. The door lock according to claim 7, wherein the driving slider is connected to a restoring means, and the restoring means applies a pre-tightening force to the driving slider, to enable the driving slider to move to the driving slider locked position.

9. The door lock according to claim 7, wherein the door lock comprises a switch box, the switch means and the swing lever being disposed inside the switch box, and the driving slider being disposed outside the switch box; and a bottom portion of the switch box has a hole, and one end of the swing lever extends outward through the hole and is configured to be driven by the driving slider outside the switch box.

10. A door lock, comprising:

a switch means;

a switch driving means, wherein the switch driving means is capable of opening the switch means; and a driving slider, wherein the driving slider is capable of driving the switch driving means, and the driving slider is capable of being driven by a door hook;

wherein:

the switch driving means is a swing lever, and the swing lever is capable of rotating to open the switch means the door lock further comprises:

a cam, wherein the cam is capable of receiving the door hook, and the cam has a locked position;

a locking slider means, wherein the locking slider means is configured to maintain the cam at the locked position; and a lock pin, wherein the lock pin is configured to lock the locking slider means the lock pin has a lock pin locked position and a lock pin unlocked position, wherein when the lock pin is at the lock pin locked position, the lock pin locks the locking slider means;

when the lock pin is at the lock pin unlocked position, the lock pin releases the locking slider means and opens the switch means;

under normal working conditions, the lock pin is capable of opening the switch means;

in the case of forced door pulling, the switch driving means is capable of opening the switch means;

the locking slider means comprises:

a first locking slider and a second locking slider, wherein the first locking slider is capable of being driven by the cam to move along a first direction (x), and the first locking slider is capable of driving the second locking slider to move along a second direction (y);

the lock pin is configured to lock the second locking slider; and the first direction (x) is perpendicular to the second direction (y);

the door lock comprises a switch box and a base, the switch means being located inside the switch box, and the driving slider and the second locking slider are arranged side by side between the switch box and the base and move along the second direction (y).

11. A door lock, comprising:

a switch means;

a switch driving means, wherein the switch driving means is capable of opening the switch means; and a driving slider, wherein the driving slider is capable of driving the switch driving means, and the driving slider is capable of being driven by a door hook;

wherein:

the switch driving means is a swing lever, and the swing lever is capable of rotating to open the switch means an elastic piece; and a stationary contact; wherein one end of the swing lever is capable of driving the elastic piece;

the swing lever has a swing lever working position and a swing lever idle position;

when the swing lever is at the swing lever working position, the swing lever detaches the elastic piece from the stationary contact, so as to open the switch means; and when the swing lever is at the swing lever idle position, the swing lever does not affect closing or opening of the switch means; and the driving slider moves between a driving slider locked position and a driving slider unlocked position along a second direction (y) along with movement of the door hook;

when the driving slider is at the driving slider locked position, the driving slider drives the swing lever to move to the swing lever working position; and when the driving slider is at the driving slider unlocked position, the driving slider drives the swing lever to move to the swing lever idle position.

12. A door lock, comprising:

a switch means;

a switch driving means, wherein the switch driving means is capable of opening the switch means; and a driving slider, wherein the driving slider is capable of driving the switch driving means, and the driving slider is capable of being driven by a door hook;

wherein:

the switch driving means is configured to rotate from a first position to a second position to engage and move the switch means to its open position;

the switch driving means is a swing lever, and the swing lever is capable of rotating to open the switch means;

the switch means comprises:

an elastic piece; and a stationary contact;

wherein:

one end of the swing lever is capable of driving the elastic piece;

the swing lever has a swing lever working position and a swing lever idle position, when the swing lever is at the swing lever working position, the swing lever detaches the elastic piece from the stationary contact, so as to open the switch means; and when the swing lever is at the swing lever idle position, the swing lever does not affect closing or opening of the switch means;

wherein:

the swing lever comprises a shaft, and the swing lever is capable of rotating about the shaft; and the swing lever further comprises an upper arm and a lower arm, a first end of the upper arm being connected to the shaft, and a second end of the upper arm being configured to connect to the elastic piece;

a first end of the lower arm being connected to the shaft, and a second end of the lower arm are capable of being driven by the driving slider.

13. The door lock according to claim 12, wherein the shaft of the swing lever is disposed parallel to the driving slider along a second direction (y).

14. The door lock according to claim 12, wherein the driving slider has a swing lever driving chamfer, and the driving slider drives the lower arm of the swing lever through the swing lever driving chamfer, and when the driving slider is at the driving slider locked position, the driving slider, through the swing lever driving chamfer, drives the lower arm of the swing lever to move to the swing lever working position.

15. A door lock, comprising:

a switch means;

a switch driving means, wherein the switch driving means is capable of opening the switch means; and a driving slider, wherein the driving slider is capable of driving the switch driving means, and the driving slider is capable of being driven by a door hook;

wherein:

the switch driving means is a swing lever, and the swing lever is capable of rotating to open the switch means an elastic piece; and a stationary contact; wherein one end of the swing lever is capable of driving the elastic piece;

the swing lever has a swing lever working position and a swing lever idle position;

when the swing lever is at the swing lever working position, the swing lever detaches the elastic piece from the stationary contact, so as to open the switch means; and when the swing lever is at the swing lever idle position, the swing lever does not affect closing or opening of the switch means; and the driving slider has a door lock driving chamfer, and the door hook drives the driving slider through the door lock driving chamfer, wherein when the door hook is inserted into a door lock hole along a third direction (z), the door hook drives, through the door lock driving chamfer, the driving slider to move along a second direction (y).

16. A control circuit of a door lock, comprising:

a switch means that includes an elastic piece with a length defined between a fixed end and a movable end that supports a movable contact;

a switch driving means, wherein the switch driving means is capable of rotating for opening the switch means by engaging the switch means at a first location along the length of the elastic piece between the fixed end and the movable contact; and a lock pin, wherein the lock pin is capable of linearly translating for opening the switch means by engaging the switch means at a second location spaced from the first location along the length of the elastic piece between the fixed end and the movable contact.

17. The control circuit according to claim 16, wherein the switch driving means is driven by a mechanical structure; and the lock pin is driven by an electronic signal.

18. The control circuit according to claim 17, further comprising:

a driving slider, wherein the driving slider is capable of driving the switch driving means, and the driving slider is capable of being driven by a door hook.

19. The control circuit according to claim 18, wherein the switch driving means is a swing lever, and the swing lever is capable of rotating to open the switch means.

20. The control circuit according to claim 19, wherein the lock pin is configured to lock and release a locking slider means to maintain or not maintain a cam at a locked position; and the control circuit further comprises:

an electronic driving means, wherein the electronic driving means is driven by an electronic signal to actuate the lock pin to lock and release the locking slider means.

21. The control circuit according to claim 17, further comprising:

a connection terminal, a control terminal and a common terminal, wherein a first current loop is formed between the connection terminal and the common terminal through the switch means, and a second current loop is formed between the control terminal and the common terminal through the electronic driving means;

the first current loop and the second current loop are connected to the common terminal through a common connection point;

the connection terminal configured for connection in series with a power supply in the first current loop through an electric motor;

the control terminal configured for connection in series with the power supply in the second current loop through the electronic driving means;

the common terminal is connected to a ground of the power supply; and the switch means is capable of being closed or opened, and the closing or opening of the switch means controls connection or disconnection of the first current loop.

* * * * *